United States Patent [19]
Larcher et al.

[11] Patent Number: 4,790,564
[45] Date of Patent: Dec. 13, 1988

[54] AUTOMATIC FINGERPRINT IDENTIFICATION SYSTEM INCLUDING PROCESSES AND APPARATUS FOR MATCHING FINGERPRINTS

[75] Inventors: Philippe Larcher, Avon; Francois Irigoin-Guichandut, Chailly-en-Biere; Daniel Vassy, Bourron-Marlotte; Michel Lenci, Moret-Sur-Loing; Patrick Longepierre, Avon; Bernard Didier, Hericy, all of France

[73] Assignee: Morpho Systemes, Avon, France

[21] Appl. No.: 16,884

[22] Filed: Feb. 20, 1987

[51] Int. Cl.⁴ .................. B42D 15/00; G06K 9/74; G06K 9/00
[52] U.S. Cl. ........................................ 283/69; 356/71; 382/5
[58] Field of Search .............. 283/67, 68, 69, 70, 283/74; 354/105; 356/71; 382/4, 2, 5, 48, 30; 351/71

[56] References Cited
U.S. PATENT DOCUMENTS

| | | | |
|---|---|---|---|
| 3,419,287 | 12/1968 | Rudie | 283/69 |
| 3,959,884 | 6/1976 | Jordan et al. | 283/69 |
| 4,047,154 | 9/1977 | Vitols et al. | |
| 4,135,147 | 1/1979 | Riganati et al. | |
| 4,151,512 | 4/1979 | Riganati et al. | |
| 4,185,270 | 1/1980 | Fischer et al. | |
| 4,186,378 | 1/1980 | Moulton | 356/71 |
| 4,325,570 | 4/1982 | Estrada | 283/69 |
| 4,641,350 | 2/1981 | Bunn | 356/71 |
| 4,684,802 | 8/1987 | Hakenwerth et al. | 356/71 |

OTHER PUBLICATIONS

Banner, "The State of Development of the FBI's Automatic Fingerprint ID System," FBI Law Enforcement Bull., Jun., 1973, pp. 9–13, Jul., 1973, pp. 14–15, 28–30.
Stock, "Automatic Fingerprint Reading," Proc.–1972 Carnahan Conference on El. Crime Countermeasures, Apr., 1972, pp. 16–28.
Wegstein, "Automated Fingerprint Identification," N. B. S. Tech. Note No. 538, Aug. 1970, pp. 1–31.

Primary Examiner—E. R. Kazenske
Assistant Examiner—Paul M. Heyrana, Sr.
Attorney, Agent, or Firm—Kenyon & Kenyon

[57] ABSTRACT

The invention is an automatic method and related apparatus for identifying fingerprints by means of comparing the minutiae of each fingerprint in a data base of fingerprints with selected ones of precomputed vector images of search minutiae in a search print to be identified, in order to determine the existence or not of a fit between the minutiae of a file print and the preselected search minutiae images, in position and angle, a result of such comparison being a matching score indicating the probability of a match between the search print and one or more file prints, the basis for selection of such precomputed vector images being the identity between the angle of a file print minutiae and the angle of a precomputed vector images of the search minutiae.

20 Claims, 16 Drawing Sheets

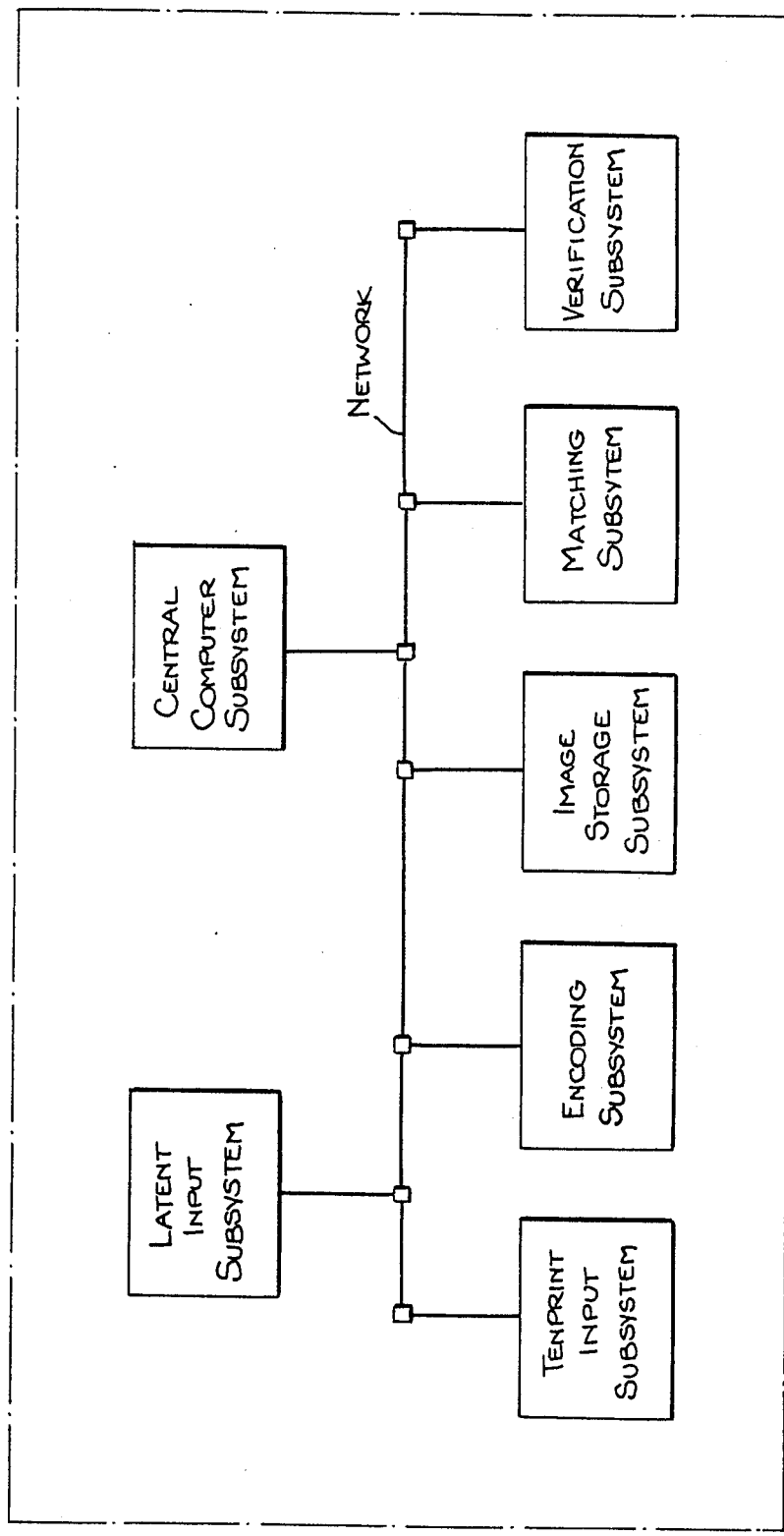

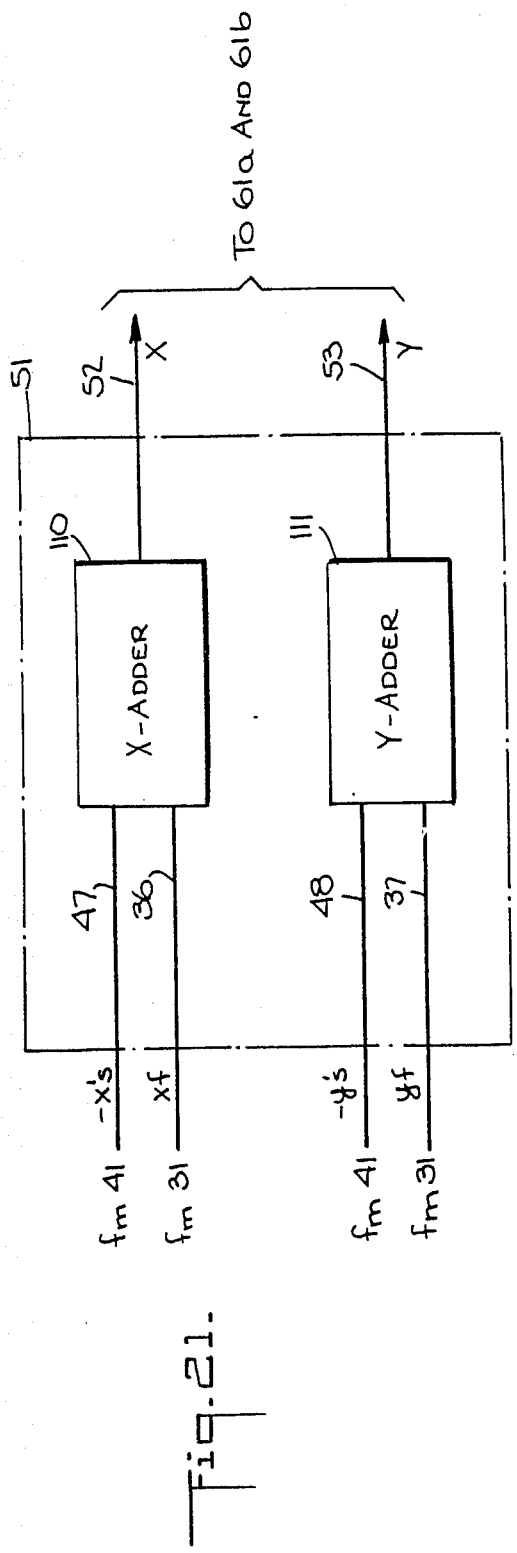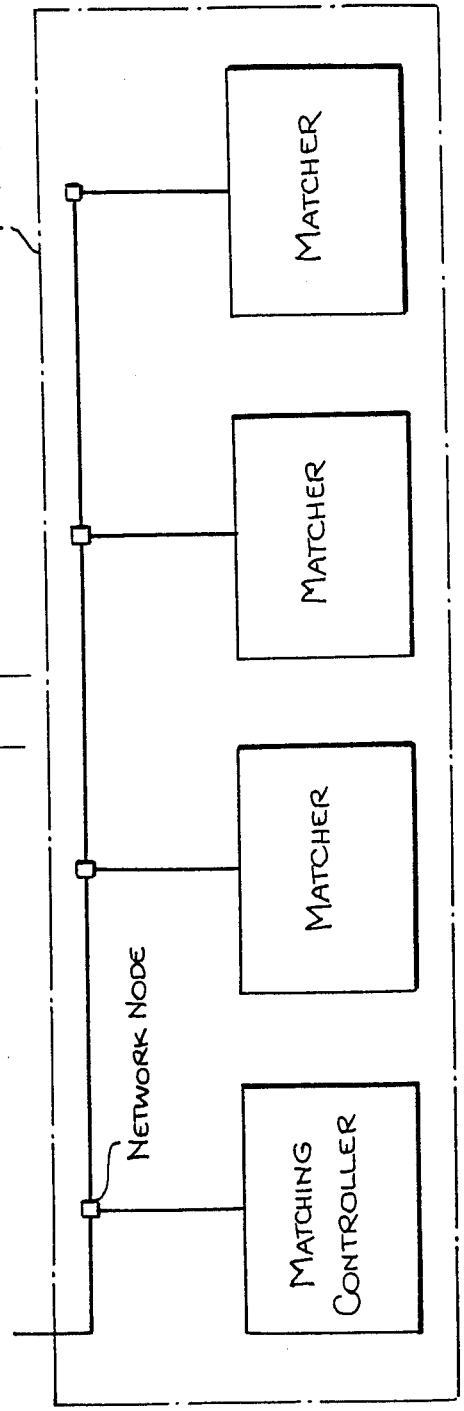

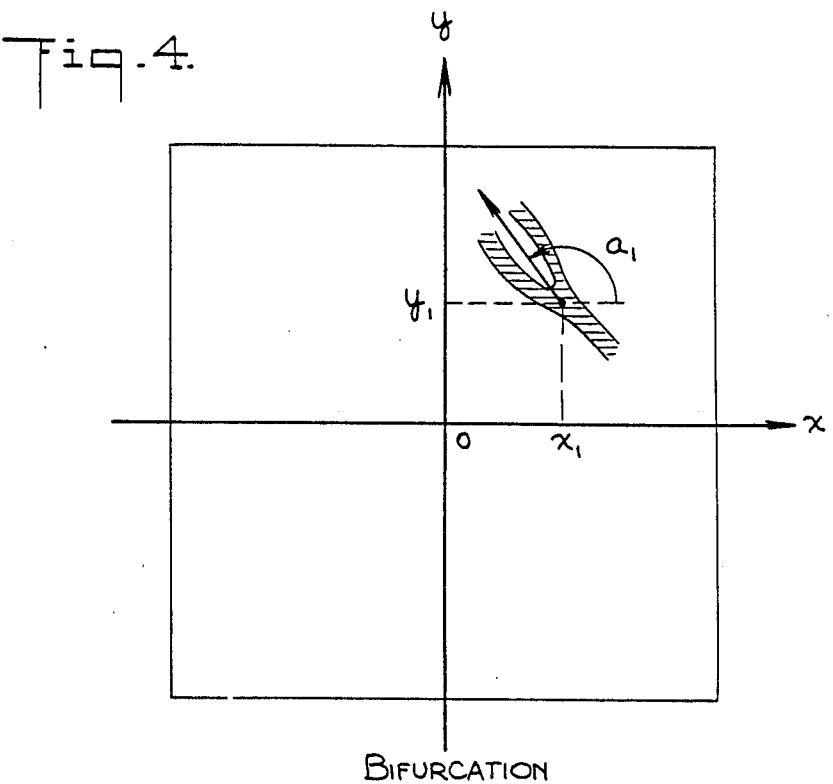
BIFURCATION
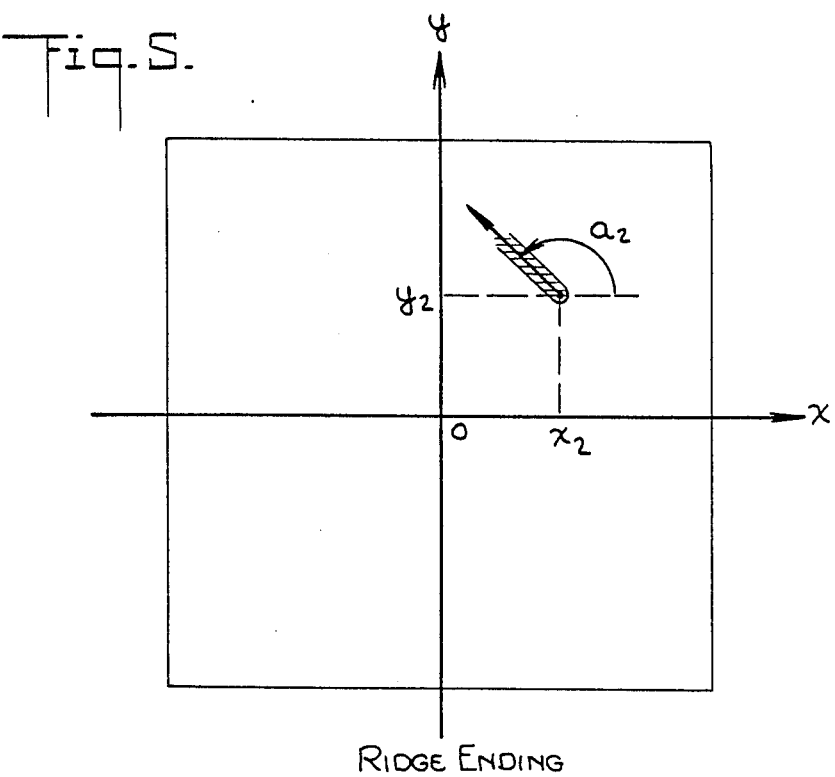
RIDGE ENDING

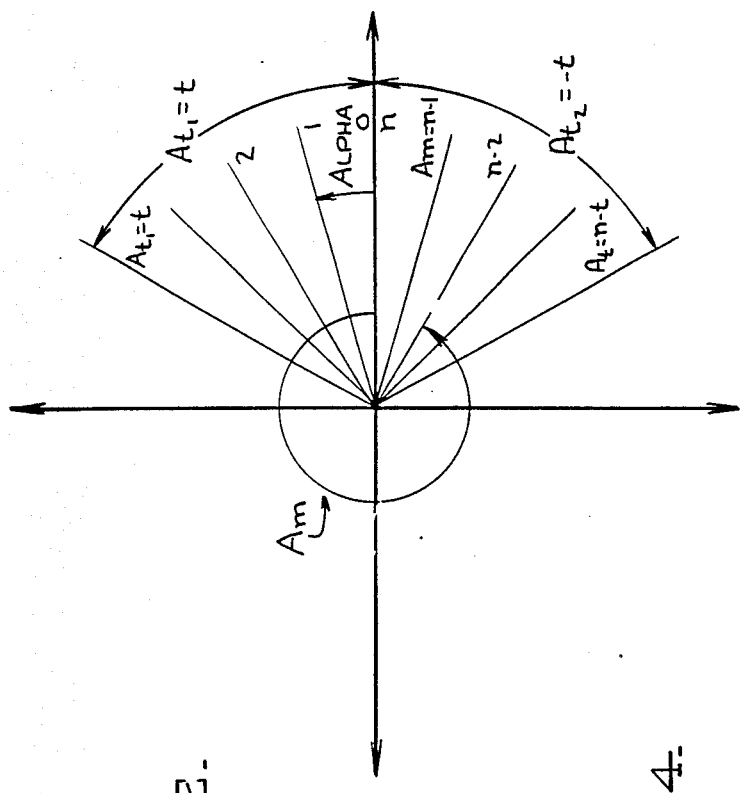

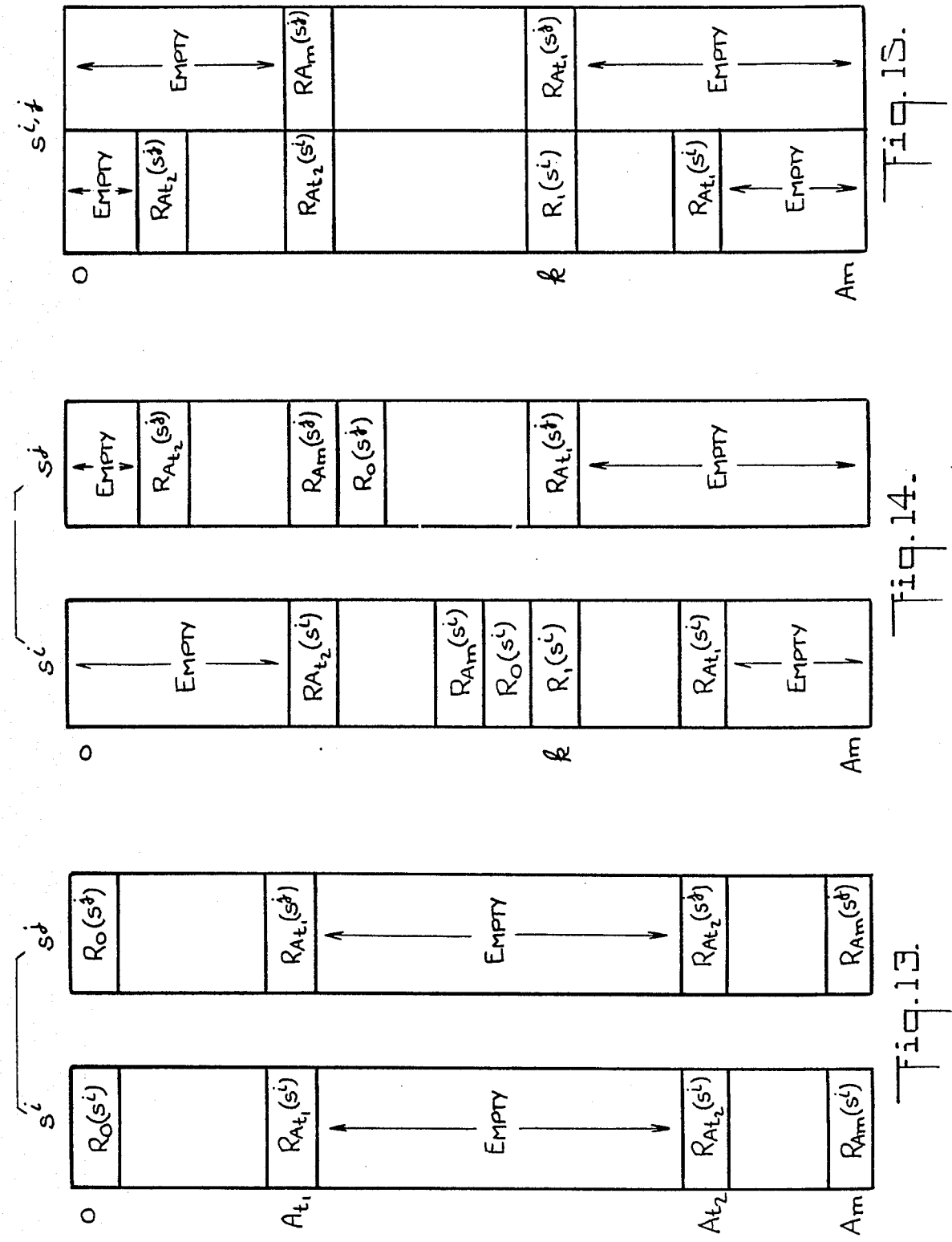

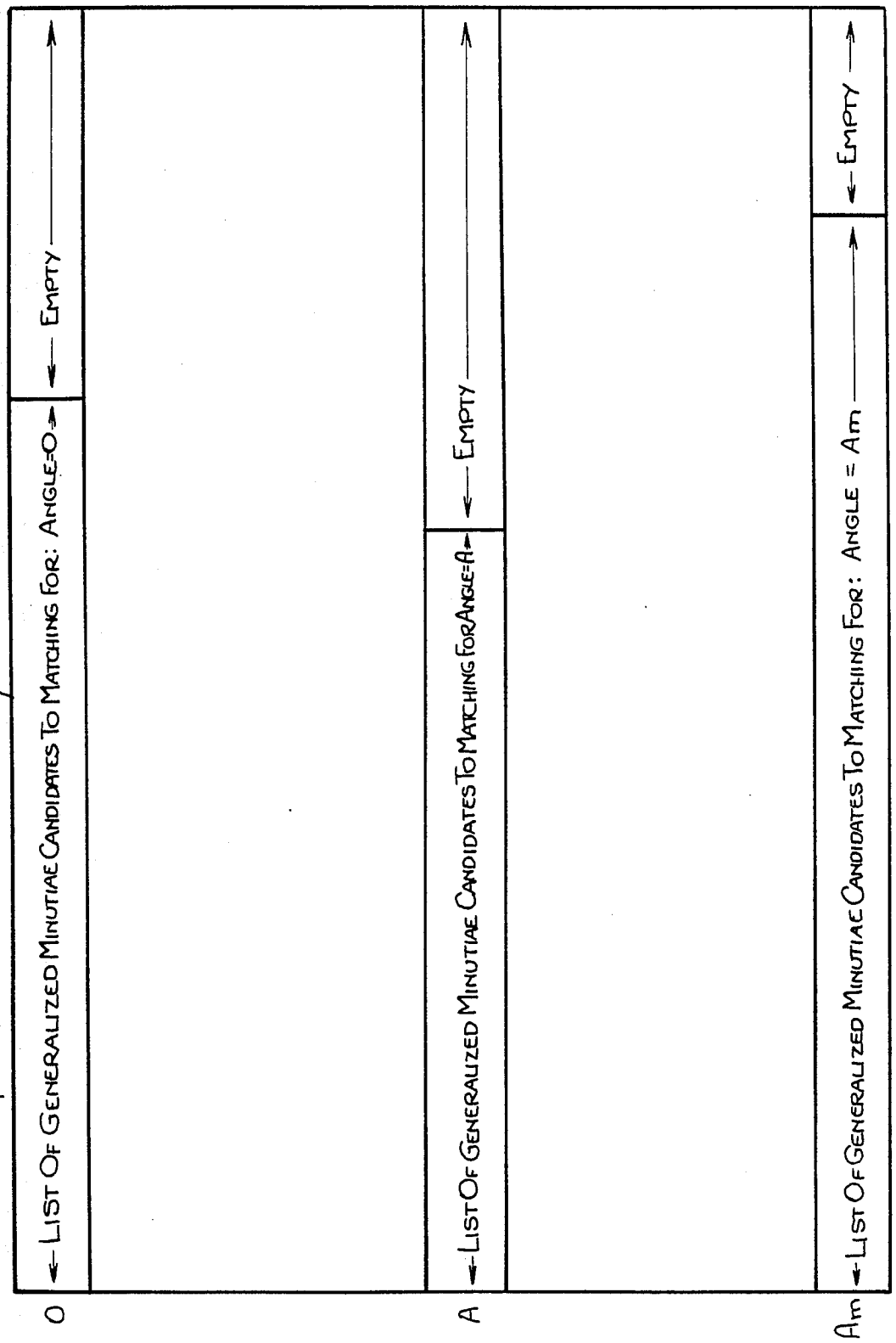

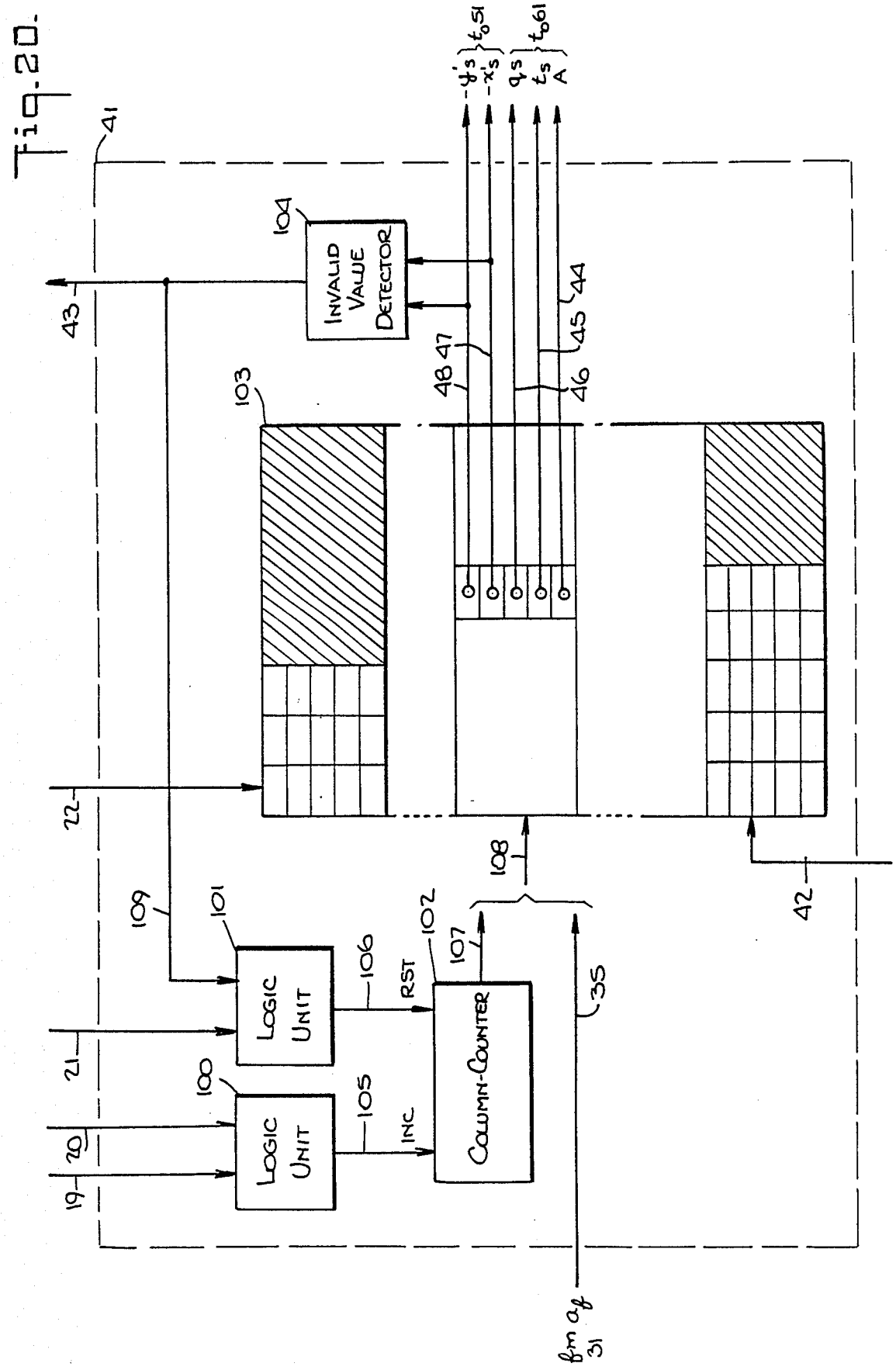

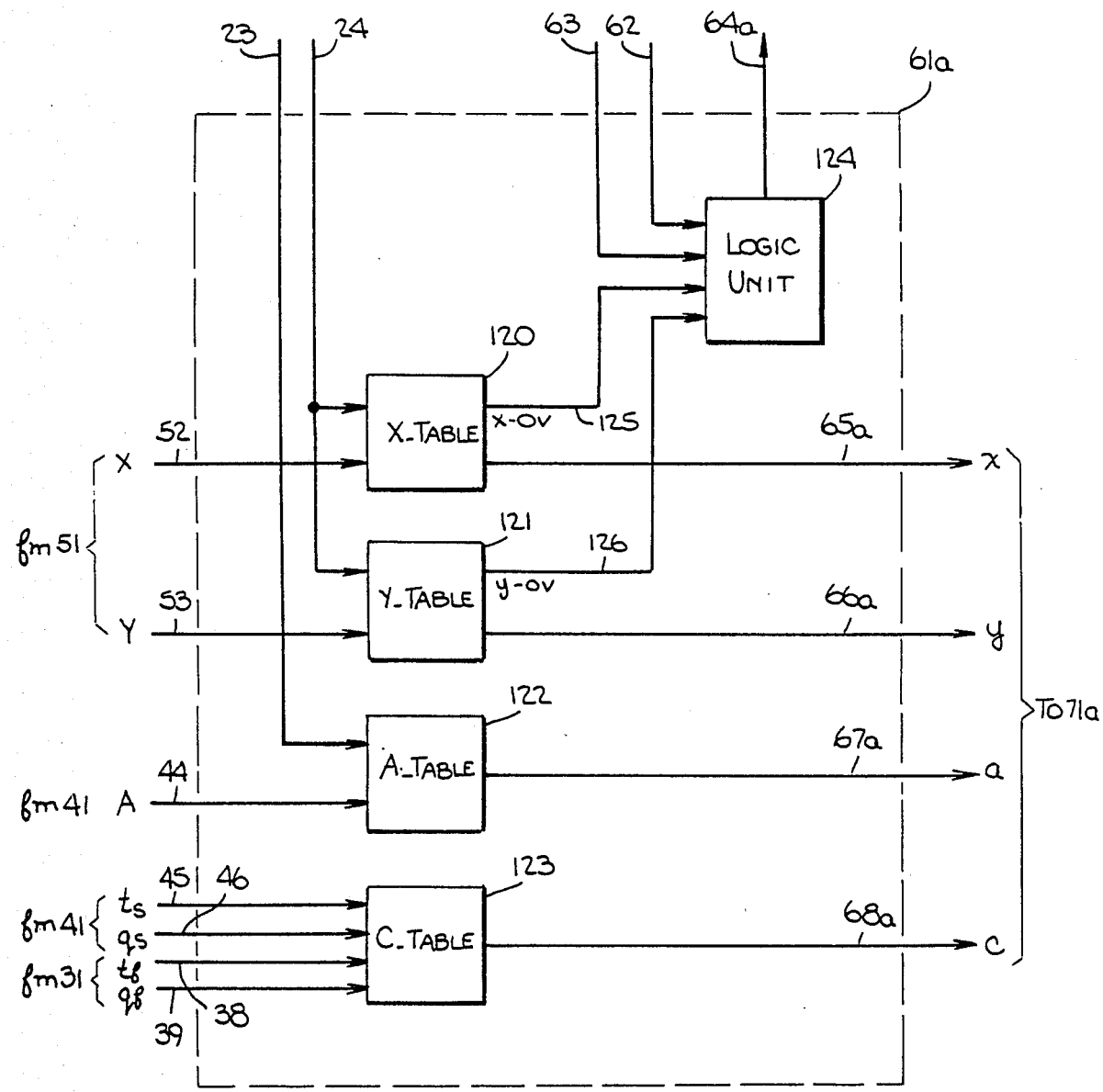

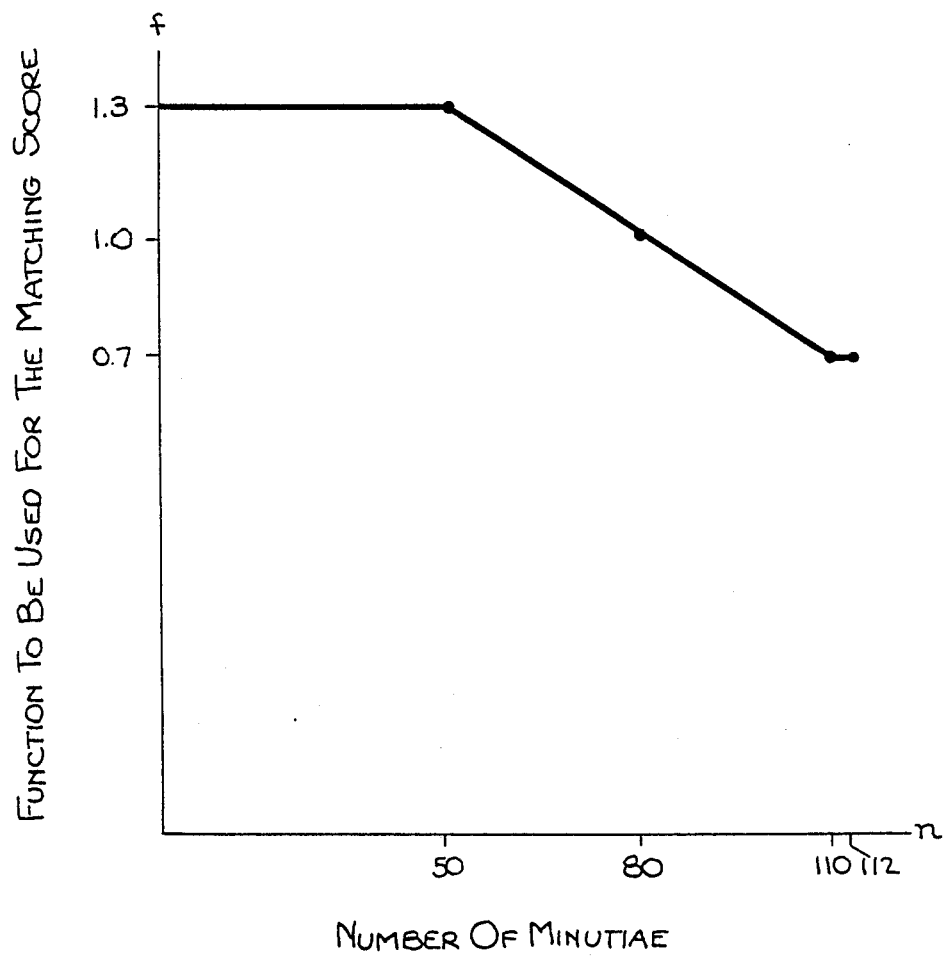

AUTOMATIC FINGERPRINT IDENTIFICATION SYSTEM INCLUDING PROCESSES AND APPARATUS FOR MATCHING FINGERPRINTS

BACKGROUND OF THE INVENTION

I.1. Definitions

A fingerprint is a particular pattern consisting of lines corresponding to the ridges and valleys appearing on the fingers, palms and soles. Since Bertillon's studies at the beginning of this century, it is well known that fingerprints contain specific features, called minutiae, which are unique and allow identification of people by their fingerprints. By definition, a minutia is either (1) a bifurcation, which is the location where a given line forks into two different lines (FIG. 4), or (2) a ridge ending, which is the location where a given line ends (FIG. 5). Minutiae are usually recorded with three coordinates: two coordinates "x" and "y" for the position of the minutia relative to a coordinate system, and one coordinate "a", which is an angle representing the average direction of the lines around the minutia point. (See FIGS. 4, 5).

The automatic "matching" of fingerprints under the control of a general purpose computer is the process of comparing two different fingerprints to determine if they come from the same finger, and thus from the same person. The automatic matching of two fingerprints utilizes a number, known as the "matching score" to indicate the degree to which two given fingerprints look alike; the greater the score, the greater the probability that the two fingerprints come from the same finger.

The automatic "identification" of a fingerprint under the control of a general purpose computer is the process of comparing a given fingerprint, called a "search print," to a database containing a set of fingerprints called "file prints," in order to determine whether the database contains a file print which comes from the same individual as the search print. Thus, if the database contains N file prints, one identification is equivalent to N matchings. The comparison of the search print against each of the N file prints produces N matching scores, which are sorted by decreasing value. Identification typically results in a short list of "candidates," which are the file prints which have produced the best matching scores. The accuracy of an automatic system for matching and identifying fingerprints is measured by its ability to place the right print in the list of top candidates.

The principal sources of fingerprint data for such database are (1) "tenprint cards", which typically contain the inkings for all ten fingers of a given individual, (2) latent prints, which are one or more parts of fingerprints left, e.g., at the scene of a crime and (3) fingerprint images obtained "live" by means of an optical apparatus for reading fingerprints directly from the hand.

A tenprint card generally includes alphanumeric data, such as name and age, and ten inked rolled fingerprints. The fingerprints are grouped in two sets, one for each hand. An approximate orientation of the prints on each card is known, since the fingerjoint is supposed to be parallel to the card's base line for the five fingerprints from the same hand.

By contrast, the orientation for latent prints is generally not known, since only a part of the fingerprint is available. Furthermore, latent prints are often of very poor image quality. As a result, the problem of accurately matching and identifying latent prints has long stood as a major problem in the art of automatic fingerprint identification systems.

I.2. Matchers

It is well known in the art of automatic fingerprint identification systems that the matching operation is, advantageously, to be performed on the minutiae of the fingerprint, instead of on the entire image of the fingerprint itself. Thus, an elementary matching operation comprises the comparison of two sets of minutiae, i.e., two sets of points, each point having three coordinates, "x", "y", and "a". An elementary matcher attempts to superimpose the two sets of points, in order to count the number of minutiae which are common to the two fingerprints.

Wegstein describes several elementary matchers of this kind in Technical Note 538 of the National Bureau of Standards, published in 1970. These matchers, named M19, M27 and M32, determine whether or not two fingerprints come from the same finger, by computing the density of clusters of points in Dx-Dy space, where Dx and Dy are the respective differences in x and y coordinates for the minutiae of two fingerprints. Experimental results referred to in this Technical Note indicate that, in Dx-Dy space, points tend to be located at random when coming from different fingerprints, whereas points tend to form a cluster when coming from fingerprints from the same finger.

In the M19 matcher, the assumption is made that the transformation needed to superimpose the two sets of minutiae points is made of a translation only. The M27 matcher is an M19 matcher with a new scoring function, intended to take into account greater translation displacements. The M32 matcher takes into account small rotations between two fingerprints in the following way: first an M27 comparison is made between the two fingerprints; then, one of the two prints is rotated through "V" degrees from its original position and a new M27 comparison is made. Altogether an M32 matching operation consists of seven M27 comparisons, corresponding to the following values for the angle V, i.e., $V = -15, -10, -5, 0, +5, +10, +15$ degrees.

I.3. The Problems In Matching In Prior Automatic Fingerprint Identification Systems An automatic fingerprint identification system utilizes a database of fingerprint data, a matcher, and a suitably configured general purpose computer. In general, fingerprints from tenprint cards are encoded into the database automatically, which means that the minutiae points are detected by an automatic device. Nevertheless, it is sometimes desirable that an operator encodes tenprint card fingerprint data manually. Fingerprint data from latent prints are usually encoded into the data base manually, because of the poor quality of the fingerprint image, although it is sometimes possible to encode data from a latent print automatically, when the print is of good quality.

Because there can be differences in accuracy of encoding between the minutiae encoded by different operators, or between the minutiae encoded by an operator and those encoded automatically, the matcher in the identification system must take into account the existence of some degree of inaccuracy with respect to one or more of the three encoded coordinates representing a minutia point. The prior automatic fingerprint identification systems fail, however, to provide compensating measures to take into account this degree of inaccuracy in encoding minutiae.

A matcher tries to fit or superimpose two sets of minutiae points by superimposing one set onto the other one. With respect to the attempt to match and identify a latent print in the prior matchers previously described, a further problem of accuracy of identification exists because the orientation and the position of the latent print relative to the orientation and the position of file prints are generally unknown. Furthermore, the differences between a latent print and file prints, in terms of distance and angle, can be critically important to successful identification, especially when the latent is a very small part of the unknown fingerprint or when the pattern of the latent print is symmetrical, in which case the latent print can even be encoded into the database upside down.

The same kinds of problems with respect to orientation and position occur when matching fingerprints from tenprint cards, although not with the same severity, because the only available information is that the difference in angles between fingerprints from the two cards can be assumed to be small, as compared with the orientation of a latent print, which can be 180° with respect to the file prints.

An additional problem in automatic fingerprint identification not addressed by the prior systems is the dependence, in accurately matching search print minutiae with file print minutiae, upon the quality of the prints being evaluated. No compensation is made in the prior art systems, either by adjustment to the matching score or otherwise, to take this factor into account, either to indicate an increased likelihood of a match where high quality prints are compared, or to indicate a decreased likelihood where either print is of lesser quality.

Similarly, the prior systems fail to consider the type of minutiae being compared in the course of the matching process. Because there is a greater likelihood of a true match when ridge endings are being compared to ridge endings, or bifurcations with bifurcations, as opposed to when ridge endings are being compared with bifurcations, taking this factor into account improves the reliability of the automatic identification system.

I.4. Objects Of The Invention

It is an object of the invention to provide a method and an apparatus for automatic identification of latent prints, regardless of whether the orientation of the latent print is known.

Additionally, it is an object of the invention to use all the available angle information with respect to latent prints, while at the same time limiting the number of computations required to perform the matching of a latent print against file prints in a database.

It is a further object of the invention to provide a method and apparatus for matching fingerprints whose minutiae have been determined by computer apparatus against fingerprints whose minutiae have been determined manually, whether or not the three coordinates of the minutiae have been correctly manually determined.

It is yet another object of the invention to minimize the errors due to the digitization of the variables used during the matching process.

It is still a further object of the invention to provide a method for matching fingerprints which takes into account the quality of the fingerprints being compared.

It is yet a further object of the invention to provide a method for matching fingerprints which takes into account the type of minutiae being compared.

It is also an object of the present invention to provide an improved method for matching fingerprints in which only minutiae of a file print having registration with minutiae of a search print are compared for all coordinates relevant to matching these minutiae.

It is still another object of the present invention to provide a method for automatically matching fingerprints which is of increased reliability over existing systems.

II. Description of the Invention

In accordance with our invention, we have provided a method for the automatic identification of fingerprints in which minutiae of a search print to be identified are matched with respect to their respective coordinates of location and angle against the coordinates of location and angle of minutiae of a plurality of file prints in a data base of fingerprints, in order to determine the existence or not of a match between said search print and one or more of said file prints, in which our improvement comprises the steps of replicating at least one search print minutia by varying at least one of its coordinates of location and angle, thereby to obtain at least one additional minutia which is different from said search print minutia in at least one of said coordinates and including said replicated minutiae in the set of search print minutiae to be compared against the minutiae of said file prints.

In further accordance with our invention, we have provided a method for the automatic identification of fingerprints in which minutiae of a search print to be identified are matched with respect to their respective coordinates of location and angle against the coordinates of location and angle of minutiae of a plurality of file prints in a database of fingerprints, in order to obtain a matching score indicative of the degree of matching between said search print and one or more of said file prints, the in which improvement comprises the steps of separately for a plurality of minutiae in said search print, computing the respective coordinates of location and angle throughout a range of pre-rotation angles, thereby to obtain a plurality of vector images of each of said search print minutiae, and separately comparing a plurality of minutiae of a preselected number of file prints in said plurality of file prints, only against those ones of said plurality of vector images having an angle, after pre-rotation, which is equal to the angle of said file minutia being compared.

In further accordance with our invention, we have provided a method for the automatic identification of fingerprints in which minutiae of a search print to be identified are matched with respect to their respective coordinates of location and angle against the coordinates of the location and angle of minutiae of a plurality of file prints in a database of fingerprints, in order to obtain a matching score indicative of the degree of matching between said search print and one or more of said file prints, in which our improvement comprises the steps of (1) assigning to at least one of the minutiae of a file print or of the search print to which it is to be compared a value indicating the quality of that minutia; and (2) for at least one comparison of a file print minutia against a search print minutia, incrementing said matching score thereby obtained by a predetermined amount when either minutia has a quality factor of a preselected value.

II.1. Brief Description Of The Drawings

FIG. 1 shows the general aspect of an automatic fingerprint identification system constructed in accordance with the present invention.

FIG. 2 shows the general aspect of a Matching Subsystem, incorporated in FIG. 1.

FIG. 4 shows the three coordinates of a bifurcation minutia.

FIG. 5 shows the three coordinates of a ridge ending minutia.

FIG. 12 shows how prerotation angles are encoded, in accordance with the present invention.

FIG. 13 and 14 show two equivalent representations of the arrangement of data with respect to search print minutiae $s^i$ and $s^j$, in accordance with the present invention, when applying a tolerance, "t", with respect to angles of prerotation applied to the search minutiae as encoded.

FIG. 15 shows a preferred arrangement of data with respect to two different search print minutiae $s^i$ and $s^j$, in accordance with the present invention, when applying a tolerance, "t".

FIG. 17 shows the aspect of a Generalized Search Buffer, constructed in accordance with the present invention using the data arrangement of FIG. 15, or Tables A–D, below, after generation of fictitious minutiae, if any, in accordance with FIG. 16.

FIG. 20 is a block diagram of a preferred embodiment of Search Data Management Unit, depicted in FIG. 18 and constructed in accordance with the present invention.

FIG. 21 is a block diagram of a preferred embodiment of Translation Computation Unit, depicted in FIG. 18 and constructed in accordance with the present invention.

FIG. 22 is a block diagram of a preferred embodiment of Address and Contribution Computation Unit, depicted in FIG. 18 and constructed in accordance with the present invention.

FIG. 24 shows alternative projections of results of minutiae matching and is useful to explain the effect of sampling a continuous function, in accordance with the present invention, in order to determine the greatest density point.

FIG. 25 shows a function, "f(n)" used, in accordance with the invention, to generate a matching score.

II.2. Description Of The Preferred Embodiment

Figure 3:
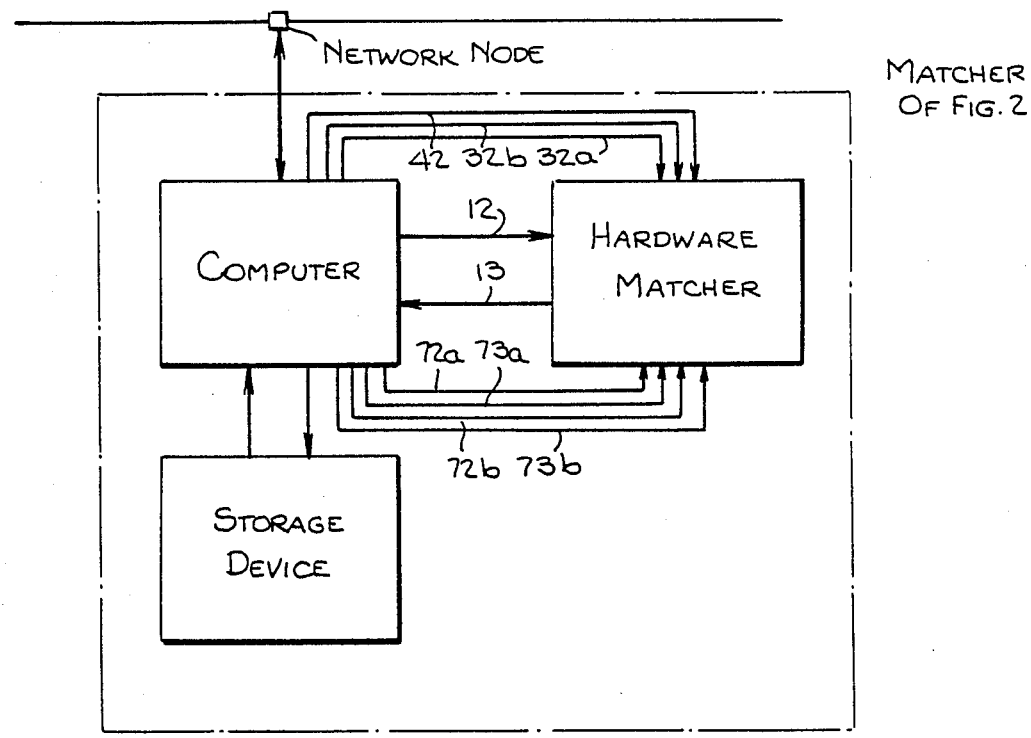
FIG. 3 shows the general aspect of a Matcher, incorporated in FIG. 2.

II.2.1. Description of a Matcher and its Environment

Referring to FIG. 1, an automatic fingerprint identification system constructed in accordance with the present invention comprises a plurality of different subsystems communicating via a high-speed network. The network is constructed such that any network node is able to communicate with any other network node; each subsystem is a network node.

The identification system of FIG. 1 includes a tenprint card input subsystem comprising camera means for obtaining images for the ten fingerprints on each card; these images are then electronically converted by appropriate circuit means from analog to digital representation in order to enable a general purpose computer to process the resultant data.

The identification system of FIG. 1 includes an encoding subsystem, which electronically utilizes by appropriate circuit means the digital image of each fingerprint, which is output by the tenprint card input subsystem, to detect the minutiae in each fingerprint and compute their "x", "y", "a" coordinates.

The identification system of FIG. 1 includes a latent print input subsystem, which is used to obtain both image and minutiae data for a given latent print by appropriate circuit means. Because of the typically poor quality of latent prints, latent prints are usually processed manually; the minutiae are then encoded into the data base by an operator using an interactive device such as a mouse or trackball, a keyboard, and a high definition video monitor.

The identification system of FIG. 1 includes an image storage subsystem, which is used to store the images for all fingerprints which are in the database; these images can be retrieved during the verification process for confirmation of the matcher's candidate list of matching fingerprints.

The identification system of FIG. 1 includes a matching subsystem, which performs several operations on its minutiae database, e.g., insertion of prints, deletion of prints, and search for matching prints. In the case of "search", the matching subsystem's input is generally comprised of the minutiae data for the search print, plus some classification information used to reduce the number of file prints to be compared with the search print, if any. The matching subsystem's output is a list of mataching file fingerprints, i.e., a candidate list, ranked using a matching score algorithm.

The identification system of FIG. 1 includes a verification subsystem, which is used to enable a fingerprint technician to compare, on a high definition video monitor, both image and minutiae of the search print and those of the file prints which have been proposed in the candidate list by the matching subsystem. If the search print is not found in the file print database, an "insertion" of the search print into the data base can be performed by the matching subsystem.

The identification system of FIG. 1 includes a central computer subsystem which regulates and controls the operation of all other subsystems, especially when queues or temporary buffers are dealt with, as is more particularly described below.

Referring now to FIG. 2, a matching subsystem constructed in accordance with the present invention comprises at least one matcher (depicted in detail in FIG. 3) and preferably a plurality of such matchers. The plurality of matchers are linked to a network, which can be either the network referenced in FIG. 1, or a specific network, which is dedicated to the matching subsystem. Operation of all matchers is controlled by a matching controller preferably comprising a general purpose computer and a storage device. The matching controller is an intermediary between each of the matchers and all other components of the identification system of FIG. 1. When a search is issued from the central computer depicted in FIG. 1, the matcher controller broadcasts the search print data to all associated matchers and then retrieves the search results of each associated matcher, in order to transmit such results to the central computer.

Referring now to FIG. 3, a matcher constructed in accordance with the invention comprises a general purpose computer controlling a hardware matcher (depicted in detail in FIG. 18), which is used to process the searches, and a mass storage device, used to store that part of the minutiae database which is managed by this given matcher.

II.2.2. Description of the Matching Principles

The matching process of the present invention relies on comparing two sets of three-coordinate points called minutiae points each of which can be visualized as a vector image. FIG. 4 and 5 define the three coordinates for the two types of minutiae (bifurcation and ridge ending respectively) which are encountered. The letters 'x' and 'y' denote the position or location coordinates and the letter 'a' represents the third coordinate, i.e., the angle between the x-axis and the direction of the lines around the minutia point.

Figure 6:
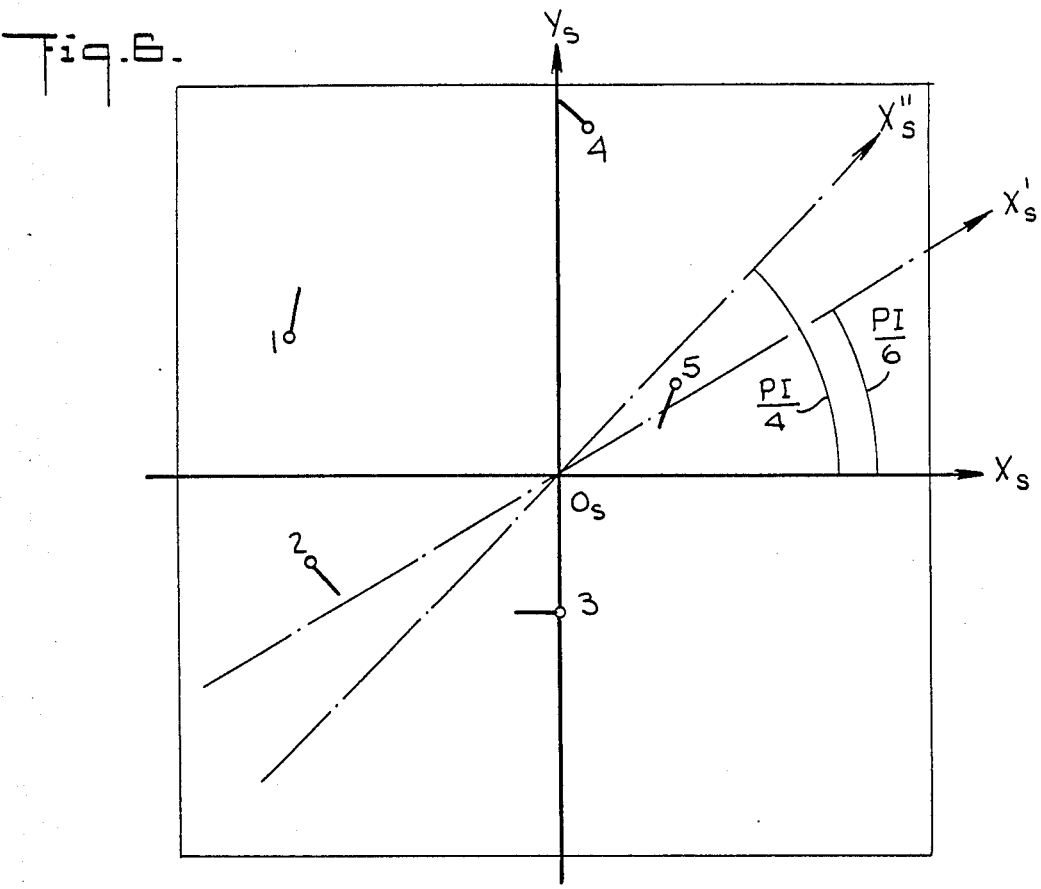
FIG. 6 shows five minutiae of a search print, relative to an arbitrary coordinate system.

FIG. 6 depicts a search print with its minutiae (in order to make the explanation clearer, only five minutiae numbered 1 to 5 have been drawn). Each minutia is symbolized with a circle, defining its x, y location, and a short line (or tail), representing the angle, a. The reference coordinate system is denoted ($\phi_s$, $x_s$, $y_s$)

Figure 7:
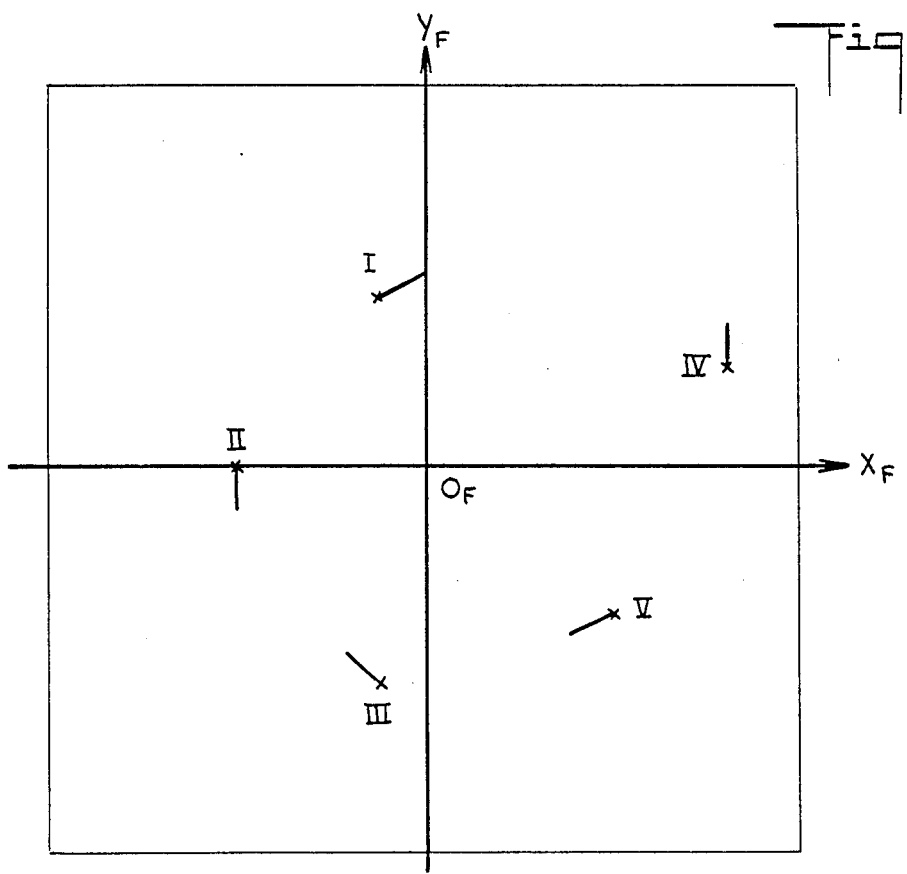
FIG. 7 shows five minutiae of the file print corresponding to FIG. 6, relative to another arbitrary coordinate system.

FIG. 7 depicts a file print that matches the search print depicted in FIG. 6. Each minatia is symbolized with a cross, defining the x, y location, and a short line (or tail), representing the angle, a. The minutiae are numbered from I to V; search minutia 1 corresponds to file minutia I, search minutia 2 corresponds to file minutia II, etc. The reference coordinate system is denoted ($\phi_f$, $x_f$, $y_f$)

Figure 8:
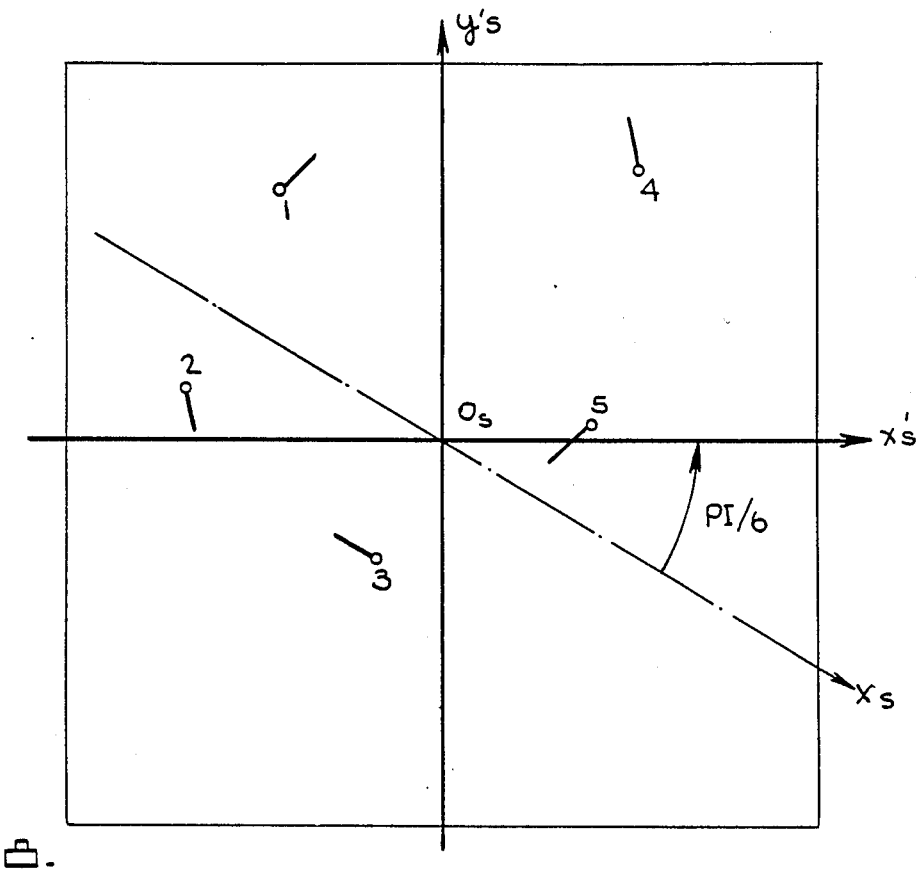
FIG. 8 shows the minutiae of the search print depicted in FIG. 6, after having rotated the reference axes through an angle of PI/6.
Figure 9:
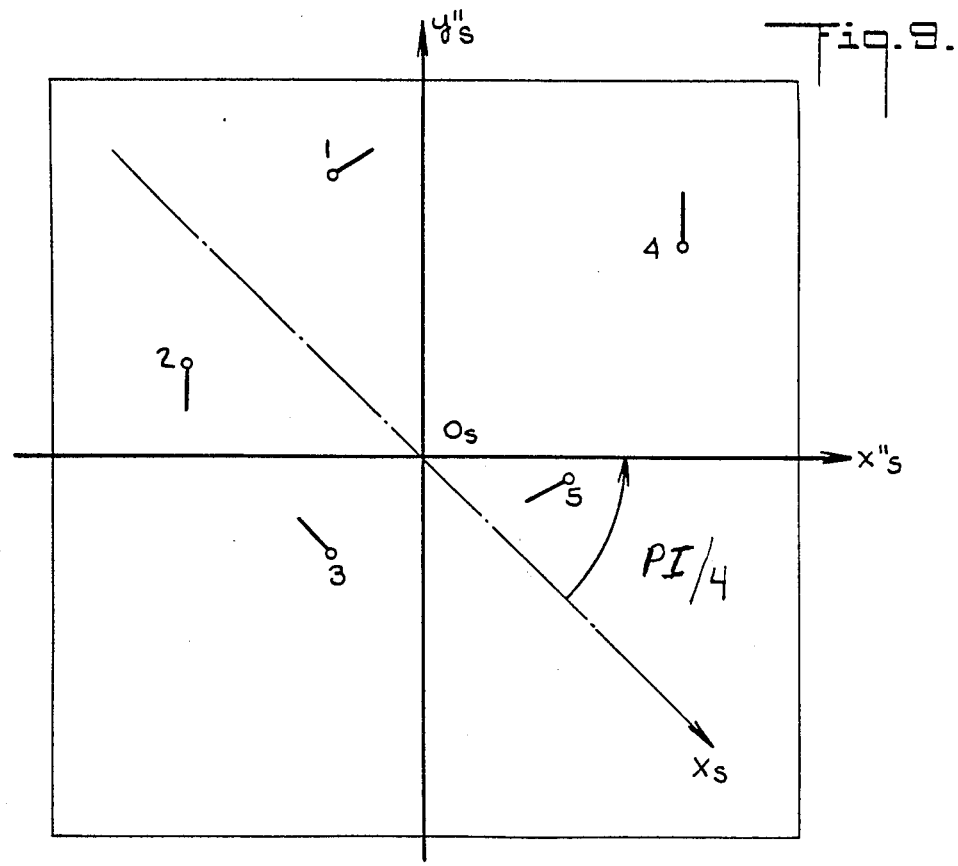
FIG. 9 shows the minutiae of the search print depicted in FIG. 6, after having rotated the reference axes through an angle of PI/4.

FIG. 8 shows the aspect of the minutiae for the search print of FIG. 6, after having rotated the search print axes through an angle of PI/6. The new reference coordinate system is denoted ($\phi'_s$, $x'_s$, $y'_s$). FIG. 9 shows the aspect of the minutiae for the search print of FIG. 6, after having rotated the search print axes through an angle of PI/4. The new reference coordinate system is denoted ($\phi''_s$, $x''_s$, $y''_s$)

Figure 10:
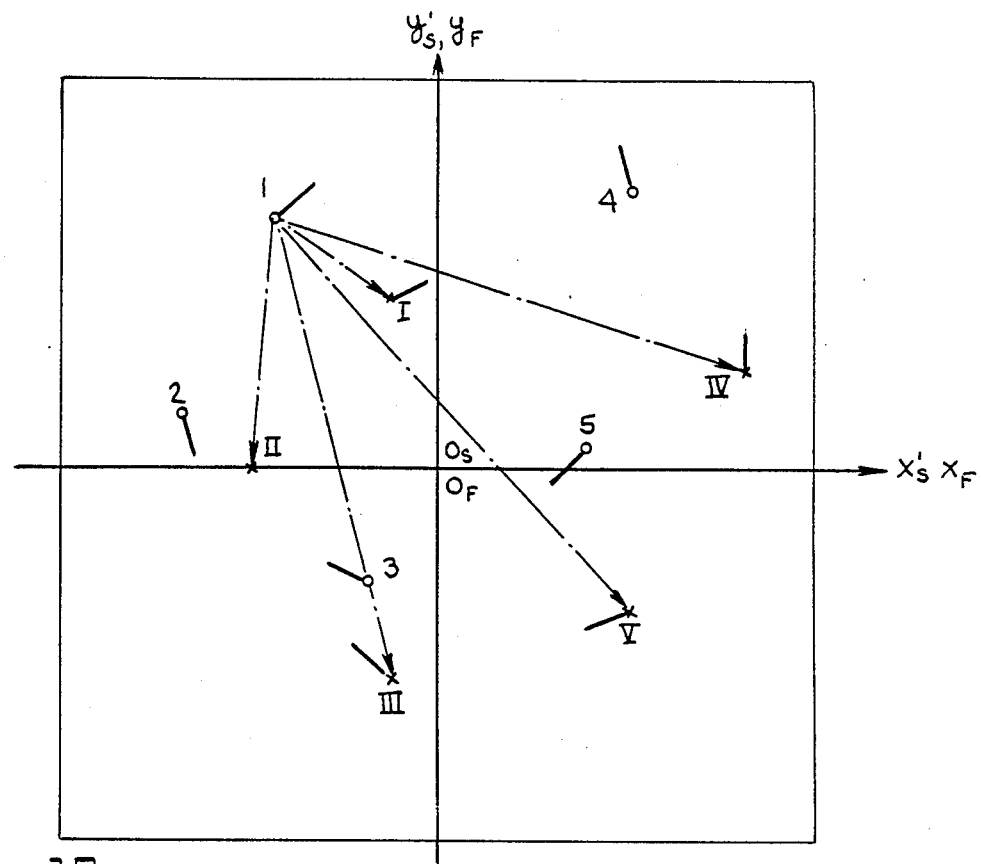
FIG. 10 shows the minutiae of the file print superimposed on the minutiae of the search print after the PI/6 rotation of FIG. 8.

FIG. 10 illustrates the superimposition of the file print minutiae of FIG. 7 and the search print minutiae after rotation of PI/6 as depicted in FIG. 8. It means that we choose: ($\phi_f$, $x_f$, $y_f$)=($\phi'_s$, $x'_s$, $y'_s$). The length of the broken line arrows in FIG. 10 show the translations which are necessary to superimpose search minutia 1 on each of the five file print minutiae (I-V) in order to make them fit for location. Making the same computations for search minutiae 2, 3, 4 and 5 separately with respect to each of the five file print minutiae shows that these translations are all different and, thus, the computations indicate a mismatch.

Figure 11:
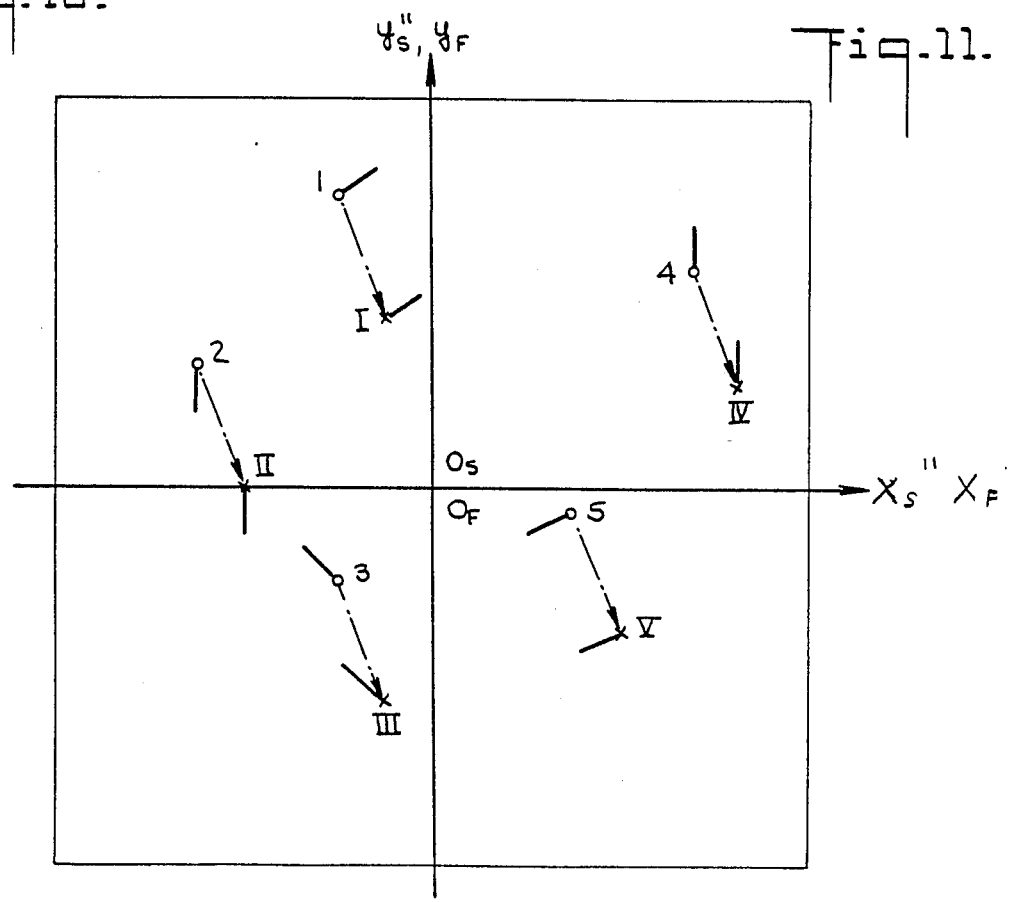
FIG. 11 shows the minutiae of the file print superimposed on the minutiae of the search print after the PI/4 rotation of FIG. 9.

FIG. 11 illustrates the superimposition of the file print minutiae of FIG. 7 and the search print minutiae after rotation of PI/4 as depicted in FIG. 9. It means that we choose: ($\phi_f$, $x_f$, $y_f$)=($\phi''_s$, $x''_s$, $Y''_s$). It is apparent that, out of the 25 possible translation-representative broken line arrows which can be drawn (one for each pair of file print minutia and search print minutia), five are identical in length and direction. Furthermore, it can be checked that this common translation which (by definition) makes the search print minutiae correspond to the file print minutiae for locations, also makes them correspond for angles. Thus, it is determined that there are five matching minutiae points between the search print of FIG. 6 and the file print of FIG. 7.

This common translation, which has been represented with broken line arrows in FIG. 11, is "THE" translation which, after "THE" rotation through PI/4, best fits the search print onto the file print and provides superimposition of the five search minutiae and the five file minutiae in location and in angle.

II.2.3. Organization of Data for the Search Print

Since the search print data are constant during a search against a database containing N file prints, we have discovered that it is advantageous to precompute some useful values from that data in order to simplify the work to be performed by the matcher and/or to speed up the matcher. For example, it is advantageous to precompute the new coordinates of the search print minutiae for each given pre-rotation. In making such precomputation, it is advantageous to select the possible values for the pre-rotation angle "A" into a finite set, consisting of the n multiples of an elementary quantity alpha, such that n times alpha is equivalent to a complete rotation through 360°, as can easily be understood with reference to FIG. 12.

Thus, the angle $A_k$ can take the values (0, 1, 2, ..., (n−1)), corresponding to: (0, alpha, 2 times alpha, ..., (n−1) times alpha), where the maximum value for A is denoted Am: Am=(n−1) times alpha=(n−1).

FIG. 13 shows precomputed data column-tables for $s^i$ and $s^j$, which denote the $i^{th}$ and $j^{th}$ search minutiae. The column-table for $s^i$ is organized so that it contains at line $A_k$ the three coordinates (x, y, a) for $s^i$, after having prerotated the reference axes through an angle whose value is $A_k$. If the coordinates for $s_i$ relative to the previous axes are (x, y, a) and the coordinates for $s_i$ relative to the new axes are (x', y', a'), the following relationships between (x, y, a) and x', y', a') are well known:

$x' = x\cos A_k + y\sin A_k$ $y' = -x\sin A_k + y\cos A_k$ $a' = a - A_k$

It is sometimes advantageous to impose a limitation on the difference in angles, which is assumed to exist, between the search print and the file print, i.e., a "tolerance"; as can be seen with reference to FIG. 12, this can be done by choosing the prerotation angle, $A_k$, in a range, which is less than 360° and which is symmetrical around the zero value, that is, if "t" stands for the tolerance in degrees, the range is $A_{t2} \leq A_k \leq A_{t1}$, where $A_{t1} = t$ degrees and $A_{t2} = -t$ degrees and no values for $A_k$ are selected for angles greater than $A_{t1}$ or less than $A_{t2}$.

Referring back to FIG. 13, the column-table shows precomputed data for a tolerance of t degrees. Thus, the noncomputed values corresponding to values of the angle $A_k$, which lie outside the range of angles defined with reference to the tolerance t, have been represented in the column-table by the legend 'empty' and the three new coordinates for minutia $s^i$, $s^j$ after having pre-rotated the reference axes through Ak have been denoted: $RA_k(s^i)$, $RA_k(S^j)$.

It should be emphasized that applying a tolerance t to the range on angle $A_k$ is not at all necessary in the process and apparatus of the present invention. However, it is a technique that can be easily implemented and used to speed up the matching process. When a tolerance t is not applied to the range on angle $A_k$, no "empty" values appear in the column-table of FIG. 13 (e.g., see Table A, below).

In accordance with the present invention, the translation obtained, which makes a search minutia location correspond to a file minutia location, is taken into account if and only if that translation also makes the angles for the two considered minutiae identical. Thus, given a file minutia $(x_f, y_f, a_f)$, the only translations which are taken into account are those, which have been precomputed with respect to a search minutia whose angle, "AFTER" a certain prerotation, is equal to the angle $(a_f)$ for the given file minutia. This aspect of the present invention leads to a reorganization of the precomputed search print data, as shown in FIG. 14.

Referring to FIG. 14, it is apparent that the column-tables for minutiae $s^i$ and $s^j$ have been rearranged so that line k contains elements such that the angle for its minutia, after rotation, is equal to k. This important aspect of the present invention is understood with reference to the following examples.

Table A shows a column-table for minutiae, $s^i$, $s^j$, and $s^l$, which have the following coordinates:

$s^i = (x_0, y_0, 3)$ $s^j = (x'_0, y'_0, 5)$ $s^l = (x''_0, y''_0, 6)$

By selecting n=64 (FIG. 12), sixty-four pre-rotation angles are used and the line number of the column-table equals the pre-rotation angle of the minutia, e.g., on line 2, the minutia coordinates $R_2(s^j) = (x'_2, y'_2, 3)$ are the three coordinates of the $s^j$ minutia, after pre-rotation of the coordinate axes through an angle defined by n=2. In precomputing the data of Table A, no tolerance t has been used. Thus, Table A is analogous to the presentation of precomputed data in FIG. 13, except Table A contains no "empty" levels, because no tolerance was applied.

TABLE A

|  | $s^i$ | $s^j$ | $s^l$ |
|---|---|---|---|
| Line 0 | $R_0(s^i):(x_0,y_0,3)$ | $R_0(s^j):(x'_0,y'_0,5)$ | $R_0(s^l):(x''_0,y''_0,6)$ |
| Line 1 | $R_1(s^i):(x_1,y_1,2)$ | $R_1(s^j):(x'_1,y'_1,4)$ | $R_1(s^l):(x''_1,y''_1,5)$ |
| Line 2 | $R_2(s^i):(x_2,y_2,1)$ | $R_2(s^j):(x'_2,y'_2,3)$ | $R_2(s^l):(x''_2,y''_2,4)$ |
| Line 3 | $R_3(s^i):(x_3,y_3,0)$ | $R_3(s^j):(x'_3,y'_3,2)$ | $R_3(s^l):(x''_3,y''_3,3)$ |
| Line 4 | $R_4(s^i):(x_4,y_4,63)$ | $R_4(s^j):(x'_4,y'_4,1)$ | $R_4(s^l):(x''_4,y''_4,2)$ |
| . | . | . | . |
| Line 61 | $R_{61}(s^i):(x_{61},y_{61},6)$ | $R_{61}(s^j):(x'_{61},y'_{61},8)$ | $R_{61}(s^l):(x''_{61},y''_{61},9)$ |
| Line 62 | $R_{62}(s^i):(x_{62},y_{62},5)$ | $R_{62}(s^j):(x'_{62},y'_{62},7)$ | $R_{62}(s^l):(x''_{62},y''_{62},8)$ |
| Line 63 | $R_{63}(s^i):(x_{63},y_{63},4)$ | $R_{63}(s^j):(x'_{63},y'_{63},6)$ | $R_{63}(s^l):(x''_{63},y''_{63},7)$ |

Table B shows a preferred rearrangement of the data of Table A such that, after pre-rotation, all coordinate values for $s^i$, $s^j$, $s^l$ on the same line, whose line number is equal to the minutia angle after pre-rotation, have the same angle, i.e., the angle identified by the line number. Thus, Table B is analogous to the presentation of precomputed data in FIGS. 14 and 17.

TABLE B

|  | $s^i$ | $s^j$ | $s^l$ |
|---|---|---|---|
| Line 0 | $R_3(s^i):(x_3,y_3,0)$ | $R_5(s^j):(x'_5,y'_5,0)$ | $R_6(s^l):(x''_6,y''_6,0)$ |
| Line 1 | $R_2(s^i):(x_2,y_2,1)$ | $R_4(s^j):(x'_4,y'_4,1)$ | $R_5(s^l):(x''_5,y''_5,1)$ |
| Line 2 | $R_1(s^i):(x_1,y_1,2)$ | $R_3(s^j):(x'_3,y'_3,2)$ | $R_4(s^l):(x''_4,y''_4,2)$ |
| Line 3 | $R_0(s^i):(x_0,y_0,2)$ | $R_2(s^j):(x'_2,y'_2,3)$ | $R_3(s^l):(x''_3,y''_3,3)$ |
| . | . | . | . |
| Line 62 | $R_5(s^i):(x_5,y_5,62)$ | $R_7(s^j):(x'_7,y'_7,6:)$ | $R_8(s^l):(x''_8,y''_8,62)$ |
| Line 63 | $R_4(s^i):(x_4,y_4,63)$ | $R_6(s^j):(x'_6,y'_6,6:)$ | $R_7(s^l):(x''_7,y''_7,63)$ |

Table C shows a column-table for the minutia $s^i$, $s^j$, and $s^l$, where a tolerance t has been applied to the pre-rotation angles selected for the column-table Table A, e.g., t=2, so that only five values of pre-rotation angle, $A_k$, are "valid", i.e., 0, 1, 2, 62, and 63, where 62 and 63 correspond to n−2 and n−1 in FIG. 12 respectively, and, thus, are the mirror images of pre-rotation vectors at 1 and 2 respectively. In Table C, "invalid" pre-rotation angles generate "empty" values, which are denoted by dashed lines. Thus, Table C is analogous to the presentation of precomputed data in FIG. 13, 14. In addition, the precomputed data of Table C have been reorganized along the lines of Table B.

TABLE C

|  | $s^i$ | $s^j$ | $s^l$ |
|---|---|---|---|
| Line 0 | — | — | — |
| Line 1 | $R_2(s^i)$ | — | — |
| Line 2 | $R_1(s^i)$ | — | — |
| Line 3 | $R_0(s^i)$ | $R_2(s^j)$ | — |
| Line 4 | $R_{63}(s^i)$ | $R_1(s^j)$ | $R_2(s^l)$ |
| Line 5 | $R_{62}(s^i)$ | $R_0(s^j)$ | $R_1(s^l)$ |
| Line 6 | — | $R_{63}(s^j)$ | $R_0(s^l)$ |
| Line 7 | — | $R_{62}(s^j)$ | $R_{63}(s^l)$ |
| Line 8 | — | — | $R_{62}(s^l)$ |
| Line 9 | — | — | — |
| . | . | . | . |
| Line 63 | — | — | — |

The positions of the "empty" values in Table C depend upon the initial value of the angle of the search minutia. Thus, any line can contain valid, as well as invalid, data, all of which would have to be compared with the coordinate data of each file print minutia, thereby undesirably extending the time of the matching operation, without securing any benefit. To dramatically improve the speed of operation, the precomputed data of Table C are reorganized, as shown in Table D.

TABLE D

|  | $s^i$ | $s^j$ | $s^l$ |
| --- | --- | --- | --- |
| Line 0 | — | — | — |
| Line 1 | $R_2(s^i)$ | — | — |
| Line 2 | $R_1(s^i)$ | — | — |
| Line 3 | $R_0(s^i)$ | $R_2(s^j)$ | — |
| Line 4 | $R_{63}(s^i)$ | $R_1(s^j)$ | $R_2(s^l)$ |
| Line 5 | $R_{62}(s^i)$ | $R_0(s^j)$ | $R_1(s^l)$ |
| Line 6 | $R_{63}(s^i)$ | $R_0(s^j)$ | — |
| Line 7 | $R_{62}(s^i)$ | $R_{63}(s^j)$ | — |
| Line 8 | $R_{62}(s^i)$ | — | — |
| Line 9 | — | — | — |
| ... | . | . | . |
| Line 63 | — | — | — |

Thus, Table D is analogous to the presentation of precomputed data in FIGS. 14, 15, and 17. In particular, the reorganization of precomputed data shown in Table D comprises pushing the non-"empty" values to the left, on each line where that is possible. As a result, no line can contain valid data occurring after (or to the right of) invalid data. Therefore, as soon as invalid data is encountered on any line, the matching process with respect to that line is terminated.

The new organization of data, exemplified by Tables B and D, is very advantageous to speeding up the matching process: given a file minutia f, there is no longer any need to compare minutia f with all values contained in a columntable for search minutia s, in order to check for a possible match. It is sufficient to compare file minutia f with the content of column-table for minutia s at the line whose angle number is equal to the value of the angle for file minutia f. Either this cell contains an 'empty' value and no association is possible, or the cell contains valid data, and a translation must be computed. Furthermore it is certain that this translation can fit minutia f and minutia s for both location and angle.

Referring now to FIG. 15, the improvement discussed with reference to Table D has been depicted: the two previous columns containing data for search minutiae $s^i$ and $s^j$ have been merged into a single table using the following rule: for a given line, push the non-'empty' values to the left, which means filling the left entry of the table before using the right entry. FIG. 14 and FIG. 15 differ on te lines containing an 'empty' value for $s^i$ and a valid value for $s^j$. Repeating this operation for all search minutiae, with respect to Tables B, C and D and FIGS. 14, 15, leads to an organization of the search buffer (column-table) depicted on FIG. 17, where line $A_k$ contains: (1) to the left: values coming from search minutiae which, after a given pre-rotation (which is stored in the table), are candidates for matching all file minutiae with an angle of $A_k$ and (2) to the right: a list of 'empty' values. It should be emphasized that now: (1) non-"empty" values stored in a given column do NOT come from the same search minutia and (2) the number of "empty" values is not the same for different lines.

Figure 16:
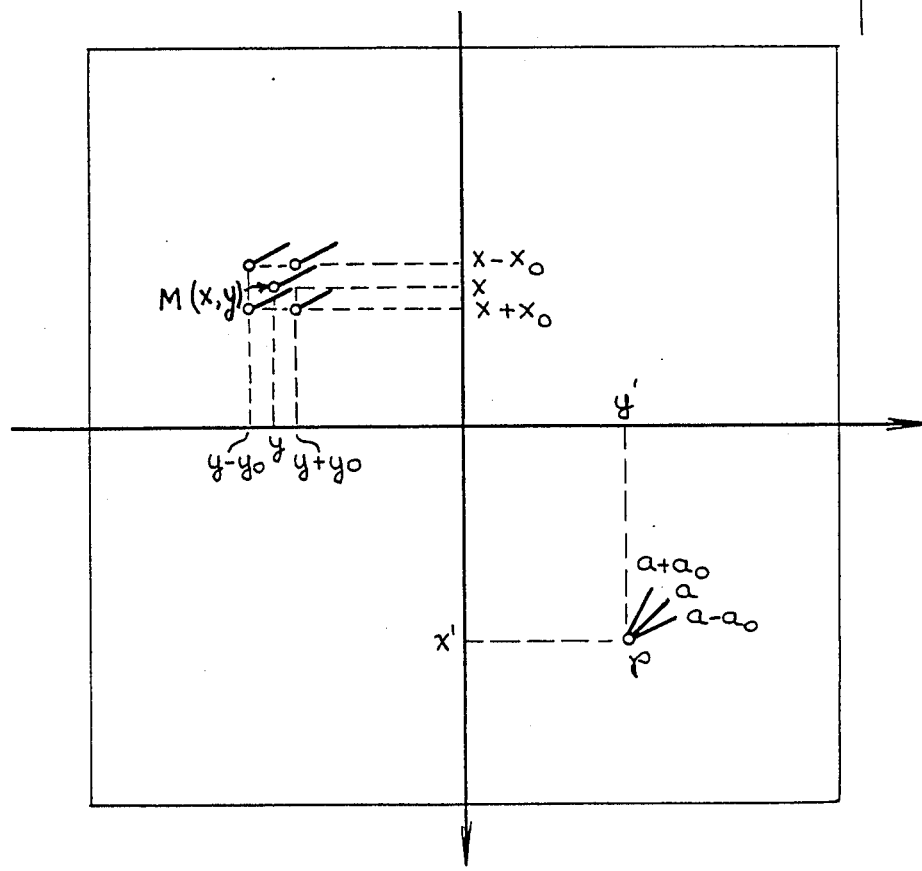
FIG. 16 illustrates the generation of fictitious minutiae, in accordance with the present invention.

FIG. 16 is useful to explain another aspect of the present invention, called "replication" or "duplication" of minutiae. The main purpose of this aspect of the invention is to deal with the inherent inconsistency existing between minutiae which are automatically encoded into the database and minutiae which are manually encoded into the database, because of the higher probability of encoding errors with respect to manual encoding, particularly when prints of poor image quality, such as latent prints, are being encoded.

In accordance with this aspect of the invention, each search minutia with coordinates (x, y, a) is replicated or duplicated in its local region of the search print by generating therefrom "fictitious" or "false" minutiae. The false minutiae are generated from the search minutia by adding to its coordinates (or subtracting from them) some incremental constants $x_0$, $y_0$ and $a_0$, which are representative of the degree of error to be encountered in the encoding process. In a typical fingerprint, the distance between two successive lines lies in the range of from 0.3 to 0.5 mm. A typical error encountered in the automatic encoding process is for a line to be skipped when a minutia point is encoded, i.e., an error of about 0.4 mm. for the x and y coordinates encoded. For the pre-rotation angle case where alpha equals 5.6 degrees, i.e., n=64, a typical error in the encoding of angle can be twice the magnitude of alpha. Thus, for typical errors in these ranges, one or more "false" minutiae can be replicated, by an operator manually encoding them into the database, using an interactive device such as a mouse of trackball, a keyboard, and a high definition video monitor. By such modification of coordinates, there is a significant probability that the "false" minutiae thereby generated will include the "actual" or "true" minutia or a minutia whose coordinates are closer to the "actual" or "true" minutia, than the coordinates encoded for the search minutia.

FIG. 16 exemplifies two interesting cases where the "false" minutiae have been generated by modifying the angle, but not the location (point P), and by modifying the x-y coordinates, but not the angle (point M). It is apparent that both modification techniques can be used simultaneously for the same minutia.

With respect to the minutiae matching process and apparatus in accordance with the present invention, no distinction is made among "true", "false", and "actual" minutiae. All are hereinafter called 'generalized search minutiae'. Referring back to FIG. 17, the column-table or search buffer depicted is called a 'generalized search buffer' It is properly understood as comprised of lines containing: (1) to the left: values coming from generalized search minutiae which, after a known rotation, are candidates for matching file minutiae having a given angle and (2) to the right: a list of empty values, which are not to be processed.

II.2.4. Operation of the Hardware Matcher of FIG. 18

Figure 18:
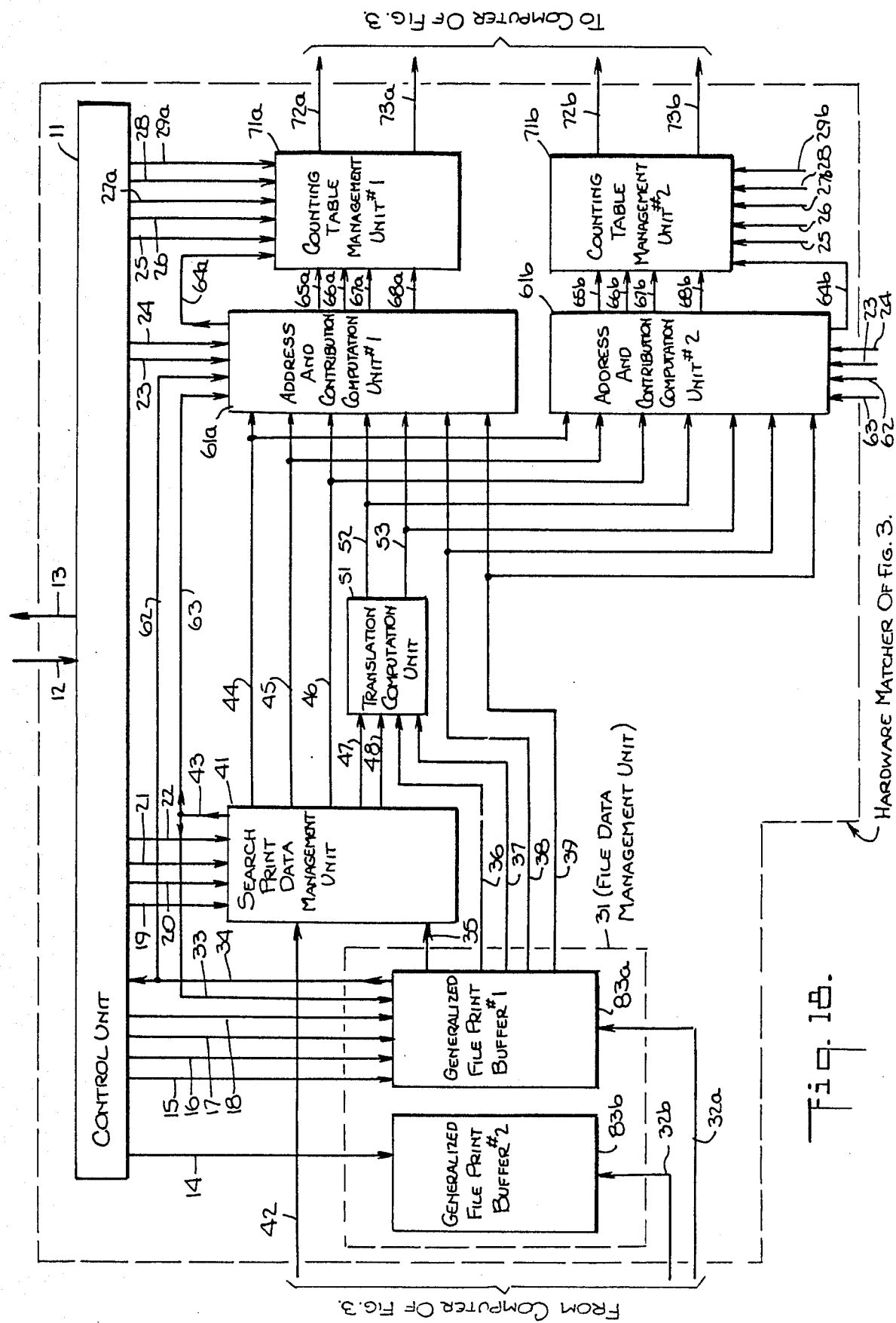
FIG. 18 is a block diagram of a preferred embodiment of the Hardware Matcher, depicted in FIG. 3 and constructed in accordance with the present invention.

With reference to FIGS. 3 and 18, the general purpose computer provides the hardware matcher with orders through control line 12 and control means 11; the computer receives messages (typically the end of run indication) from control unit means 11 through line 13. The hardware matcher comprises a file data management unit 31, a search data management unit 41, a translation computation unit 51 and two arrays of counting table management units 71a and 71b, whose operation is controlled by the two address and contribution computation units 61a and 61b.

In operation of the hardware matcher, first, line 28 is activated to reset all counter means to a zero value. Then the search data management unit 41, which comprises random access memory means, is loaded with generalized search minutiae data, using control line 22 and data line 42. File buffer means 83a of the file data management unit 31 is then loaded, using control line 14 and data line 32a, with data concerning several file fingerprints. Finally, while file buffer means 83b is loaded using control line 14 and data line 32b, the control lines necessary to start matching of the search print data stored in the search data management unit 41 against the file print data now stored in file buffer means 83a are activated in order to complete the following operations for each file fingerprint in file print buffer means 83a:

(a) for each minutia f with coordinates ($x_f$, $y_f$, $a_f$) of the file fingerprint currently being processed, and (b) for each generalized search minutia s with coordinates ($x_s$, $y_s$) and pre-rotation angle $A_k$, located in line a of the search buffer:

(1) compute the translation (X, Y) necessary to fit ($x_s$, $y_s$) onto ($x_f$, $y_f$);

(2) increment two counter means (means 131 in FIG. 23) corresponding to:

(i) the pre-rotation $A_k$ and (ii) the translation (X, Y);

(3) for each of the two arrays of counter means (131), update, if necessary, the maximum value in another counter means (means 135 in FIG. 23) and its corresponding 'coordinates' (A, X, Y) for the most frequent transformation encountered;

(b2) activate the 'end of run' signal

The 'end of run' signal is activated each time a file print is so processed. The 'end of run' signal enables the computer to read the maxima values stored in the counter means tables and their coordinates ($A_{max}$, $X_{max}$, $Y_{max}$) in order to compute a score which depends on the values stored in the counter means for similar transformations, i.e. for coordinates (A, X, Y) which are slightly different. After all file prints of file print buffer means 83a have been processed, matching of the search print buffer data against file print buffer means 83b data is started, to initiate and complete the foregoing operations, while file print buffer means 83a is loaded with new file fingerprints, and so on.

All these operations are understood with the following descriptions of the components of the hardware matcher, using FIG. 19 to 23, while FIG. 18 is used to keep in mind a general overview of the matcher.

II.2.5. Description of the File Data Management Unit

Figure 19:
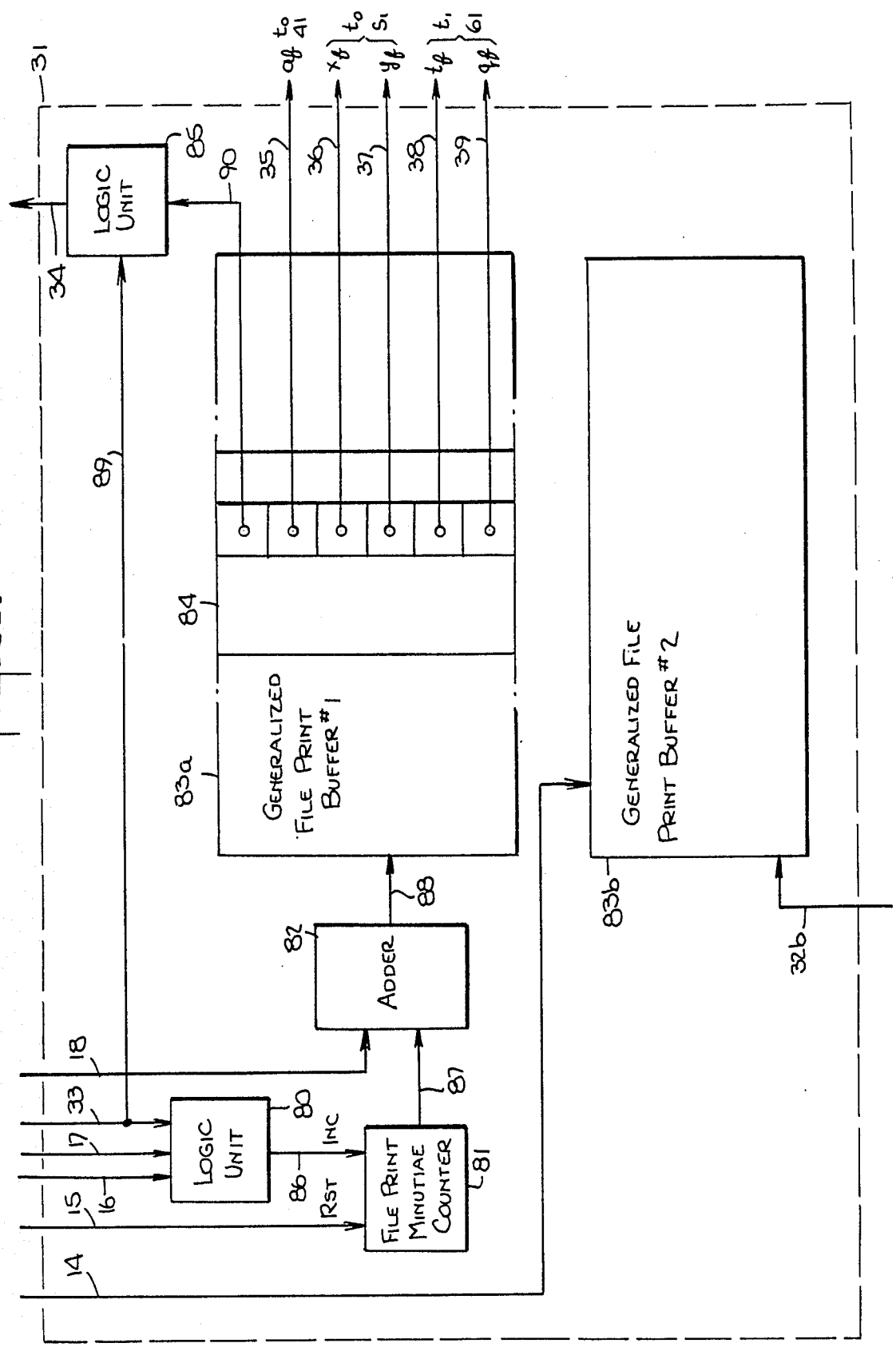
FIG. 19 is a block diagram of a preferred embodiment of File Data Management Unit, depicted in FIG. 18 and constructed in accordance with the present invention.

Referring to FIG. 19, file data management unit 31 includes file print buffer means 83a and 83b, which can be random access memory means, operating in two different modes. File print buffer means 83b, driven by 'load' control line 14, is loaded via data line 32b. At the same time, file print buffer means 83a, driven by 'run' control line 16, is operated in "matching" mode. It should be noted that, for the clarity of the drawing, signal lines are not shown duplicated, although they all are: one set for file print buffer means 83a and one set for file print buffer means 83b. Output of data, if any, is taken at lines 35-39 from the file print buffer means which is in "run" mode.

A principal purpose of file data management unit 31 is to provide the translation computation unit 51 of FIG. 18 with the coordinates of the file minutiae. In other words, it is an address generator means for file print data, which is responsive to control lines 16, 17, 33 and 18.

Typically, minutiae data of 128 different file fingerprints have been loaded from a mass storage device into generalized file print buffer means 83a. Control line 18 functions to provide the address of the first minutia of the file fingerprint 84 which is currently being matched against the search fingerprint.

Proceeding from one file print minutia to the next is done by incrementing counter means 81. Control signals representative of the result of the incrementation (via line 87) and the start-address (via line 18) are supplied to adder means 82, which provides on line 88 the address for the current minutia in the generalized file buffer means 83a.

File print minutiae counter means 81 is allowed to change its value (line 87) by means of a control signal on the 'increment' line 86. The control signal on line 86 is generated by logic circuit means 80, which is fed by three control lines 16, 17, and 33. Control line 16 is the 'run' line. Control line 17 is a clock used to synchronize the computations of the different parts of the hardware matcher. Control line 33 is derived from line 43 (FIG. 18), which is an output of search data management unit 41. Control line 33 is used to indicate whether or not the current generalized search minutiae table contains an 'empty' value. If "yes", this means that the current file minutia has been compared to all non-'empty' values of the generalized search minutiae from the current row of the search data management unit 41. Thus, file print minutiae counter means 81 is incremented if and only if the control signals on control lines 16, 17 and 33 simultaneously indicate: run mode and clock pulse and end of row on search data management unit 41, respectively.

The file print minutiae counter means 81 (FIG. 19), is also responsive to control line 15; this line provides a "reset" signal (FIG. 19), which is used to restore the counter means to zero. This reset function is performed once before initiating the matching of the current file fingerprint against the current search fingerprint, so that the output 88 of adder circuit means 82 is equal to start-address plus zero. The first value of line 88 is thus equal to the address of the first minutia for the current file print.

The content of file print buffer means 83a at the address indicated by line 88 is output onto lines 35, 36, 37, 38, 39 and 90 which transmit the data available for the current file print minutia. Lines 35, 36 and 37 carry the three coordinates ($a_f$, $x_f$, $y_f$) previously described, while lines 38 and 39 carry the "type", $t_f$, and the "quality", $q_f$. The "type" is a binary information signal indicating that the minutia at hand is either a bifurcation or a ridge ending, while the "quality" is a number representing the clarity of the fingerprint in the locality where the minutia is located. Quality is thus related to the probability that the encoded minutia is a true minutia or not. The number representing the quality of a minutia lies in a range from 0 to N, where a quality of "$q_f$" equal to 0, represents the highest clarity; the greater the value of $q_f$, the worse the clarity of the fingerprint in the locality of the minutia being considered and the smaller the probability that the minutia, as encoded, is a true or actual minutia. We prefer to choose N=63, i.e., the quality information $q_f$ has 64 different possible values.

Referring again to FIG. 19, line 90 conveys a flag bit, indicating whether the current file print minutia is the last one or not. Upon the simultaneous indication of end of current file print minutiae data (via line 90) and indication of end of row from the search print data management unit (via line 89), the logic circuit means 85 outputs an "end of current run" signal, via line 34, to control means 11 (FIG. 18). The 'end of run' signal line is activated if and only if the control signals on lines 89 and 90 simultaneously indicate end of row and last file minutia, respectively.

II.2.6. Description of the Search Print Data Management Unit

Referring now to FIG. 20, search print data management unit 41 comprises a generalized search print buffer means 103, as described with reference to FIG. 17, which comprises random access memory means, and an address generator means comprising logic circuit means 100, 101 and column counter means 102. The address generator means is controlled by control lines 19, 20 and 21, data line 35 (which is an output of file data management unit 31, as shown in FIG. 18) and internal control line 109.

A principal purpose of the address generator means is to generate the addresses for all generalized search minutiae, which are located in a row of generalized search buffer means 103, the row-number being equal to the angle $a_f$ of the current file print minutia. This is done by concatenating the value of the angle, provided by data line 35, and the output 107 of column-counter means 102, giving the full address 108.

Similar in structure to the previously described file print minutiae counter means 81 (FIG. 19) in the file data management unit 31, column counter means 102 is responsive to two control lines 105, 106. Line 105 is the "increment" control line, which allows the counter means to add one to its output 107, while line 106 is the "reset" control line, which forces the output 107 to a zero value.

The 'increment' line 105 is generated by the response of logic circuit means 100 to signals on control lines 19 and 20. Control line 19 is a "run" control line, equivalent to "run" control line 16 for file data management unit 31, while control line 20 is a "clock" control line. "Clock" control line 20 has the same period as "clock" control line 17 previously described with reference to unit 31; however, a delay between the two clock signals is necessary to take into account the fact that signal 35 is an output of file data management unit 31, while control lines 19 and 20 carry output signals directly from control means 11 (FIG. 18). Column counter means 102 is incremented, via increment line 105, if and only if control signals via lines 19 and 20 simultaneously indicate run mode and clock pulse, respectively.

The 'reset' line 106 is generated by logic circuit means 101 from control lines 21 and 109. Control line 21 is a "start of run" control line, similar to control line 15 for unit 31. Line 21 is activated by control means 11 once before each comparison of the search print and any of the file prints. Line 109 carries a control signal generated inside the search print data management unit 41 by "invalid value" detector means 104, described in detail below. The control signal on line 109 is the 'end of row' indication. Column counter means 102 is reset if and only if control signals via lines 21 and 109 indicate: start of run or end of row.

The different effects of the 'end of row' indication on file minutiae counter means 81 (used in file data management unit 31) and column counter means 102 (used in search data management unit 41) are as follows. Because the 'end of row' indication means that the current file print minutia has been compared to all possible matching search print minutiae, the end of row signal implies the need for an incrementation of the file minutiae counter means 81, in order to output the data (a, x, y, t, q) for the next file print minutia, while also implying the need for a reset of the column counter means 102, in order to generate an address 108 corresponding to the first column of generalized search print buffer means 103 and thereby repeat the matching process with respect to the next file print minutiae and the search print data contained in buffer means 103 at the row number which is equal to the angle, $a_f$, of the next file print minutia.

The content of generalized search print buffer means 103 at the address indicated by line 108 is output onto lines 44, 45, 46, 47 and 48, which transmit the data available for the current generalized search minutia. Lines 45 and 46 carry the "type" $t_s$ and the "quality" $q_s$. Line 44 carries the value A of the angle through which the reference axes of the search print have been rotated to get the new coordinates $(x'_s, y'_s)$ of the current generalized minutia. In order to simplify the "hardware" construction of the translation computation unit 51 (FIG. 18), the negatives $(-x'_s, -y'_s)$ of those coordinates can be stored in generalized search print buffer means 103 instead of $(x'_s, y'_s)$. The stored values are carried by data lines 47 and 48. As shown in FIG. 18, data lines 47 and 48 are input to translation computation unit 51, as also are output lines 36 and 37, which carry $x_f$ and $y_f$ data from file data management unit 31. Data lines 45 and 46, and 38 and 39 from unit 31, which carry the "type" and "quality" data of the respective search and file print minutiae, are supplied to address and contribution units 61a and 61b, to which data line 44, which carries the angle A data, is also connected.

Before turning to a description of the invalid value detector means 104, it is observed that if the coordinates (x, y) of a vector are stored within a given range of x and y values, then the coordinates (x', y') of the image of the same vector, after a given rotation, must be stored in a wider range of x and y values, e.g., if the initial coordinates (x, y) lie in the range $[-100, +100]$, i.e., $-100 \leq x \leq 100, -100 \leq y \leq -100$, then the coordinates (x', y') after a prerotation may fall outside the range $[-100, +100]$. For instance, choosing $x = y = +100$ and prerotating the vector through PI/4 gives $x' = 141$, $y' = 0$. It can be demonstrated that this is the worst case, i.e., the range $[-141, +141]$ is sufficient to represent all possible values (x', y'), whatever the pre-rotation angle, when x and y lie in the range $[-100, 100]$. As an example, it is impossible to have $x' = y' = 200$ for x, y in the range $[-100, +100]$.

It is preferred to store the search minutiae coordinate values $(-x'_s, -y'_s)$ carried by data lines 47 and 48 in a range which is at least twice as large as the range in which the coordinate values $(x_f, y_f)$ from file prints, which are carried by data lines 36 and 37, are stored. In one embodiment of the present invention, the coordinates in file print buffer means 83a and 83b can be stored in 8 bits, in order to enable 256 different values, while x-y coordinates for search print buffer 103 can be stored on 9 bits, in order to enable 512 different values. As was already said, some of these 512 values are "impossible" or "invalid" values. This feature is used to represent what was referred to previously (e.g., Tables C, D suora) as "empty" values.

Referring to FIG. 20, data lines 47 and 48 are coupled to invalid value detector means 104, whose output 43 (the "end of row" indication) is sent to file data management unit 31 (via line 33), to address and contribution computation units 61a and 61b (via line 63), and to logic circuit means 101 of search buffer management unit 41 (via line 109).

It should be noted that FIG. 20 shows the search data management unit 41 in its run functioning mode. Prior to running, the generalized search print buffer means 103 is loaded with search print data from computer storage before a search is initiated. This is accomplished by activating control line 22, called the "load" control line, while data line 42 is used to carry the data to be loaded into generalized search print buffer means 103.

II.2.7. Description of the Translation Computation Unit

FIG. 21 depicts a translation computation unit 51 comprising two adder circuit means 110, 111 having four data input lines and two data output lines. Two input lines 36, 37 are data outputs from file data management unit 31 (FIG. 19), while two input lines 47 and 48 are data outputs from search data management unit 41 (FIG. 20).

In particular, data lines 36, 37 carry the coordinates $(x_f, y_f)$ for the current file minutia, while data lines 47 and 48 carry the negatives $(-x'_s, -y'_s)$ of the coordinates for the current pre-rotated generalized search minutia. The translation needed to superimpose the search minutia $(x'_s, y'_s)$ onto the file minutia $(x_f, y_f)$ has coordinates (X, Y), which are obtained by supplying the four data lines to the two adders, x-adder circuit means 110 and y-adder circuit means 111, respectively. Adder circuit means 110, line 52, carries the sum X of the two input lines 47 and 36. The output of y-adder circuit means 111, line 53, carries the sum Y of the two input lines 48 and 37.

In order to avoid overflows in these computations, the X and Y values carried by output data lines 52 and 53 are in a wider range than the ones used to store the four input 37 are typically 8 bits wide (which allows 256 different values), while lines 47 and 48 are 9 bits wide (which allows 512 different values); output data lines 52, and 53 are arranged to be 10 bits wide (which allows 1024 different values).

II.2.8. Description of the Address and Contribution Computations Units

FIG. 18 shows two identical address and contribution units 61a and 61b, driven by the same control lines 23, 24, 62 and 63 and fed with the same data input lines 44, 45, 46, 52, 53, 38 and 39. Each of the units 61(a), 61(b) generates one control line 64(a), 64(b) respectively and four data lines 65a–68a 65b–68b, respectively, which are input lines for a counting table management units 71a, 71b, respectively, described in detail below. Each address and contribution computation unit 61a, 61b is assigned its own counting table management unit 71a, 71b. The input lines for units 61a and 61b have the same inputs, whereas similar output lines from units 61a and 61b have different outputs, for the reasons set forth in more detail below.

Referring now to FIG. 22, one of the two units 61a has been depicted. Due to the ranges used to store the coordinates for file and search minutiae, the number of different translations that can be output by translation computation unit 51 is very large. One of the purposes of unit 61a is to project the value A of the pre-rotation-angle and the values (X, Y) of the translation into smaller ranges, in order to reduce the number of counters required in the associated counting table management unit 71a. This is accomplished by translation table means 120 for X, 121 for Y, and 122 for A. These translation tables can be stored in PROMs (Programmable Read Only Memory).

X-table means 120 receives two input lines, data line 52 which carries the X-coordinate of the translation for the current file and search minutiae, which is an output from translation computation unit 51, and data line 24, output by control means 11, which is the "xy-mode" line. The "xy-mode" line allows selection from the different functions stored in X-translation table 120. Such functions include the choice of the number of bits (within predefined values) to be used to store the output value x, carried by data line 65a. Typically 4 or 5 bits, that is 16 or 32 different values, are chosen. Such functions additionally include the determination of whether or not some input values are invalid, e.g., translations greater than the half-size of the fingerprint image. This "overflow" condition is carried by "x-overflow" line 125.

Y-table means 121 has the same construction and manner of operation as X-table means 120. Its inputs are "xy-mode" line 24 and line 53, which carries the Y value output from translation computation unit 51. From these inputs, y-table 121 generates the second coordinate y for the translation, carried by data line 66a, and the 'y-overflow' line 126.

"A"-table means 122 is very similar to X-table means 120 and Y-table means 121. It outputs on data line 67a the pre-rotation angle "a" ("a"=$A_k$) from the value A, carried by data line 44, and control line 23, which is the 'a-mode' line. The 'a-mode' line allows representing the angles on 5 or 6 bits, that is 32 or 64 different values. No 'overflow' line is provided for the A-table means 122, because generalized minutiae corresponding to invalid pre-rotation-angle values are not stored in generalized search print buffer means 103. Rather, they were replaced by 'empty' values to avoid useless comparisons, in order to increase the speed of operation of the matcher.

In order not to take into account invalid translations, unit 61a outputs on line 64a an 'invalid value' signal, generated by logic circuit means 124 from two external control lines 62 and 63, and two internal control lines 125 and 126. Referring to FIG. 18, line 63 is the "end of row" signal, issued from search data management unit 41. This signal indicates that the current generalized search minutiae is an 'empty' value, i.e., invalid data. Line 62 is the 'end of run' signal, generated by file data management unit 31. Lines 125 and 126 are 'overflow' lines coming from translation table means 120 and 121. Logic circuit means 124 enables the 'invalid value' signal 64a if and only if the control signals on lines 62, 63, 125 and 126 indicate: end of run or end of row or x-overflow or y-overflow.

FIG. 22 shows that, in addition to lines 65a, 66a and 67a representing the current pre-rotation and translation, unit 61a generates another output line 68a. This line carries the contribution, denoted "c", associated with the current pre-rotation and translation. The contribution is output by "c"-table means 123, according to the values carried by data input lines 45, 46, 38 and 39. Lines 45 and 46 are output by search data management unit 41 and carry the "type" and "quality" for the current search minutia. Lines 38 and 39 are output by file data management unit 31 and carry the same data for the current file minutia.

It is well known by fingerprint technicians that, by reason of, over- or underinking, the type of a minutia in the same fingerprint may change from one impression to the other; however most of the minutiae in the same fingerprint keep their type (bifurcation or ridge ending) from one impression to the next. Thus, it can be said that, when two minutiae match for location, angle and type, the probability that they are the same is greater than when they only match for location and angle.

The "c"-table means 123 thus contains data such that the "contribution" for two minutiae with the same type is greater than the "contribution" for two minutiae with different types. Similarly, when one of the two minutiae is of good "quality", the "contribution" is given a bonus value. There is no bonus when both minutiae are of poor quality.

As described above in detail, the quality is represented by a number in the range from 0 to N. In the preferred embodiment, N equals 63 and a minutia is considered a good minutia when its associated quality number is $q \leq 7$. Thus, if $q_s$ and $q_f$ denote the numbers for the qualities of the current search print minutia and the current file print minutia, respectively, the bonus for good quality is computed according to the following rules, which adds bonus for good quality:

(1) if $q_s < 8$ or $q_s < 8$, then the bonus is 1 and
(2) if $q_s \geq 8$ and $q_f \geq 8$, then the bonus is 0.

To summarize, the "c"-table means 123 is constructed and arranged such that the contribution "c" is equal to a standard value (for instance 5) plus a bonus value, if any, for common types (for instance 1) plus a bonus value, if any, for good quality (for instance 1).

II.2.9. Description of the Counting Table Management Units (Units 71a, 71b in FIG. 18)

Figure 23:
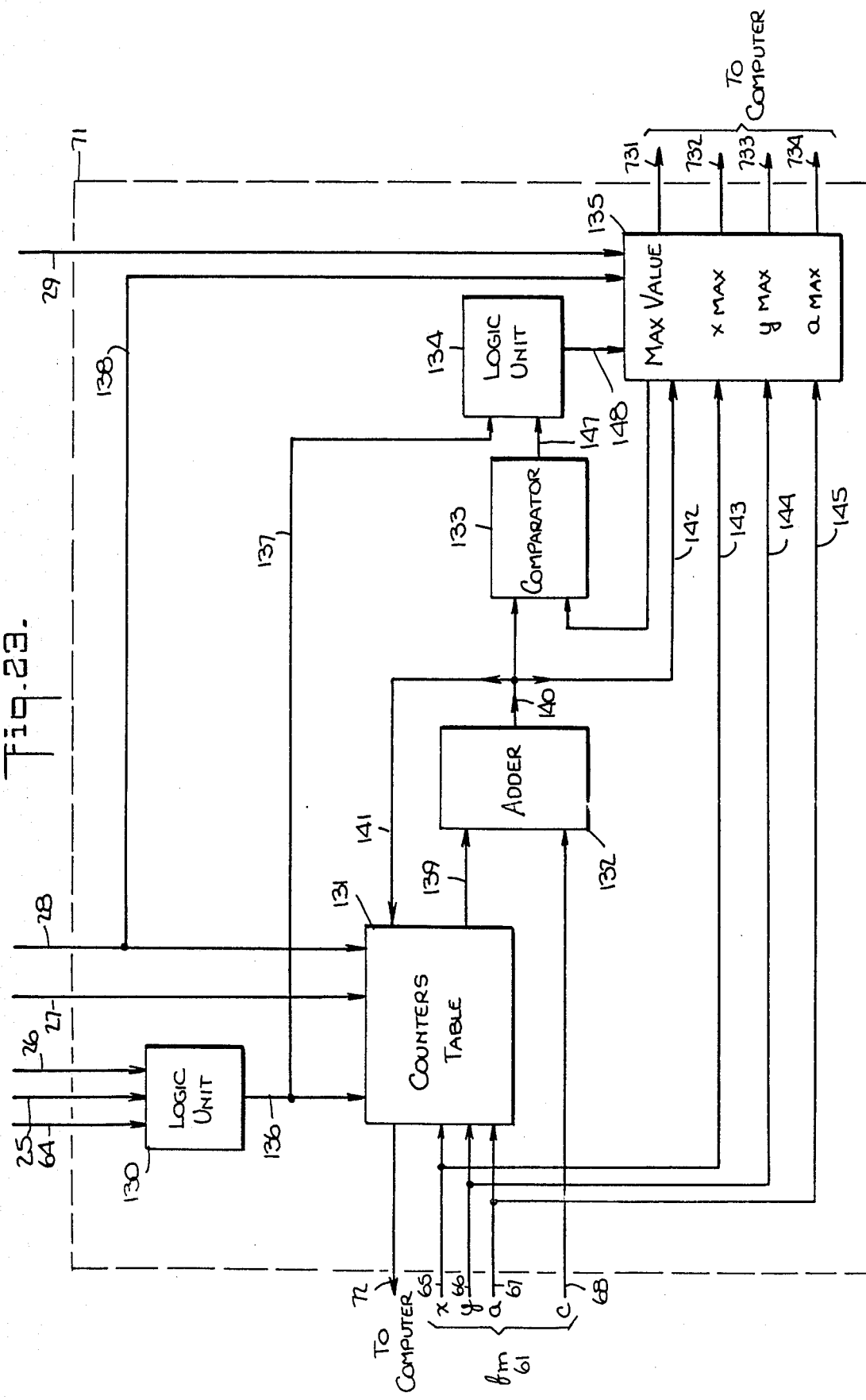
FIG. 23 is a block diagram of a preferred embodiment of Counting Table Management Unit, depicted in FIG. 18 and constructed in accordance with the present invention.

The purpose of a counting table management unit 71, depicted in FIG. 23, is to give rapid access to the translation which, associated with a given pre-rotation, most often results in a match between a search minutia and a file minutia. Accordingly, unit 71 updates two tables after each minutiae pair comprising one search minutia and one file minutia has been processed. These tables are counter table means 131 and "max" table means 135, which comprises random access memory.

Counter table means 131 contains one counter circuit means for each different transformation performed, e.g., pre-rotation and translation, as previously described, represented by the triplet of values (x, y, a) carried by data lines 65, 66 and 67, output from the associated address and contribution computation unit; each counter circuit means is associated with a triplet (x, y, a).

"Max" table means 135 contains the data relative to the current maximum content of counter table means 131, i.e., for all pairs of search minutia and file minutia that have already been processed. "Max" table means 135 contains at the end of the run the maximum content of counter table means 131.

Counter table means 131 is driven by three different control lines 27, 28 and 136, corresponding to different functioning modes. Control line 28 is a "reset" line, which allows establishment of an initial value of zero in all different counter circuit means. This line is activated once, prior to initiating a run. Control line 27 is the "read" line, which is used after the end of a run to enable the computer to read the contents of counters table 131 via data line 72, in order to compute the matching score. Control line 136 is the "enable update" line, generated by logic circuit means 130 in response to control signals on control lines 25, 26 and 64. Lines 25 and 26, generated by control means 11 (FIG. 18) are respectively the "run" line and the "clock" line, which are the same as the "run" and "clock" lines already described with reference to the file data management unit 31 (FIG. 19) and search data management unit 41 (FIG. 20). Line 64, which is an output of an associated address and contribution computation units 61(a), 61(b) (FIG. 18), indicates whether the data carried by input lines 65, 66 and 67 are valid or not. Control line 136 enables updating of counter table means 131 if and only if the control signals on control lines 25, 26 and 64 simultaneously indicate: run mode and clock pulse and valid data.

In the run mode, counter table means 131 outputs on its "data out" line 139 the current content of the counter means associated with the triplet of values (x, y, a). This is done by concatenating these values and considering them as an address for counter table means 131. Adder circuit means 132 is used to compute the sum 140 of the current counter means value 139 and the current contribution "c", provided by data line 68. The sum is diverted to line 141, which is the 'data in' line for counter table means 131. If control line 136 enables it, the content of the current counter means is updated with the value carried by line 141.

The output 140 of adder 132 is supplied to comparator circuit means 133, which also receives via line 146 the current maximum value stored in "max" table means 135. The output 147 of comparator circuit means 133 and a diversion 137 of 'enable update' line 136, controlling update of counter table means 131, are supplied to logic circuit means 134 in order to generate another 'enable update' signal for use by "max" table means 135, only. Update of "max" table means 135 is enabled if and only if the control signals on lines 137 and 147 simultaneously indicate: enable counters table means 131 update and the value carried by input line 140 of comparator 133 is greater than the value carried by input line 146.

If "enable update" line 148 allows it, the four memory cells constituting max table means 135 are simultaneously updated with the data carried by line 142, diverted from output 140 of adder circuit means 132 (the new value of the maximum content of counter table means 131) and lines 143, 144 and 145, derived from input data lines 65, 66 and 67 (the triplet of values (x, y, a) representing the current pre-rotation and translation).

"Max" table means 135 is also responsive to control lines 138 and 29. Control line 138 is a "reset" control line, derived from "reset" control line 28 for counter table means 131; it is used to re-initialize to zero all the data contained in "max" table means 135. Control line 29 is a "read" control line which allows the computer (FIG. 3) to read through the four data lines 731 to 734 the contents of "max" table means 135. For convenience, two sets of the four data lines 731, 732, 733, 734 have been merged into two unique output data lines 73a, 73b on FIG. 18.

As previously noted, there are two address and contribution computation units 61a and 61b and two counting table management units 71a and 71b in the matcher depicted on FIG. 18. This is to avoid potentially undesirable effects caused by the way pre-rotations and translations are encoded, for use in the counting table management unit.

It should be remembered that the coordinates (A, X, Y) are projected from wide ranges into smaller ranges. When sampling a continuous function, i.e., when taking the values of the function only for a limited number of different values of the variable, it is known that the smaller the number of values taken, the smaller the amount of information that can be deduced from that limited number of values.

Moreover, FIG. 24 depicts the results of analysis of the density of the values which are taken by the function being sampled. The exact values which are taken by a given function have been represented by small vertical bars, which will be referred to as marks. After projecting these values into 10 equivalent cells, globally referenced as 'projection A', it can be seen that cell 1 contains one mark, cell 2 is empty, cell 3 contains 3 marks, and so on. If the density of the function under consideration is estimated by choosing the cell in which most marks have fallen, then cells 3, 4 and 6, which all contain 3 marks, are candidates.

However, the density of the marks inside cells 3 and 4 is greater than the density inside cell 6. Furthermore the true accumulating point, i.e., greatest density, is closer to the boundary between the two cells 3 and 4.

This estimate of density can be corrected for by using a slightly different rule, when projecting the true values into a smaller range, as depicted in 'projection B'; comparing 'projection A' and 'projection B' shows that the different cells have been translated by an amount equal to one half the width of one cell.

As a result, the contents of the ten cells have been completely modified, particularly in that cell 3 now contains 6 marks, which is a better indication of the density of the marks. A simple comparison of the contents of the cells containing most marks in projections A and B is enough to choose the best indication of the density.

Since three independent coordinates (A, X, Y) are projected in the matching techniques of the present invention, there should be $2 \times 2 \times 2$ ($=2^3$) or eight different counter table means 131, in order to properly take into account the effects previously described. However, we have discovered that there is a compromise between the profit that is gained from this improvement and the cost of the hardware needed to realize it. Experiments have shown that it is enough to use only two different counter table means 131. Moreover, the second counter table is derived from the first counter able by simultaneously translating all three coordinates by an amount equal to the half-size of the cell relative to this coordinate. Thus, output lines (control line 64 and data lines 65 to 68) from address and contribution computation units 61a and 61b do not necessarily provide the same information. Indeed, it is advantageous, as we have discovered, that they do not provide the same information. For example, an overflow may exist for one unit and not for the other one, as can be seen in FIG. 24, where the mark falling into cell 1 of projection A overflows in projection B. As previously described, all other control lines for units 61a and 61b (lines 23, 24, 62 and 63) are common to these two units.

As previously described above, the matcher of FIG. 2 incorporates a general purpose computer (FIG. 3), one of whose functions is to compute a matching score. In general, the preferred matching score takes into account the contribution of two minutiae (one search print minutia and one file print minutia) being compared, i.e., the quantity by which the counter means 131 is incremented and the nature of the score function itself, i.e., given at least one and preferably several counters tables means 131, the particular matching score function should compute a value which is as large as possible when the search print and the file print come from the same finger.

We prefer to use a function "f(n)", where "n" is the number of file print minutiae, as depicted in FIG. 25. As shown in FIG. 25, for $1 \leq n \leq 50$, $f(n) = 1.3$; for n in the range $50 \leq n \leq 110$, $f(n) = 1 + (80 - n)/100$; for $110 \leq n \leq 112$, $f(n) = 0.7$. For each comparison of the search print against a file print, we select whichever counter tables means 131a, 131b gives the best maximum and compute the matching score from the 26 cells around the maximum content of the counter tables means 131a, 131b selected. If "b" denotes the value of that maximum and "d" denotes the value of the second maximum inside the 26 surrounding cells, the matching score "M" is computed from the following formula:

$$M = (b^2 + d^2) \times (W) \times (f(n)),$$

where W denotes the sum of the squares of the values for the surrounding 26 cells.

II.2.10. Conclusion

The specific circuitry incorporated in the particular embodiment of an automatic fingerprint identification system constructed in accordance with the present invention and described with reference to FIGS. 18–23 can be constructed from discrete elements or advantageously from integrated circuits. The following table lists of examples of such components.

TABLE E

| Component | Quantity and Code |
| --- | --- |
| 80, 81, 82 | 2-AM 2940 (mfd. by AMD) |
| 83a | 4-M5M5256 (mfd. by Mitsubishi) |
| 83b | 4-M5M5256 (mfd. by Mitsubishi) |
| 102 | 3-74F161 (mfd. by Fairchild) |
| 103 | 1-MS 62256 (mfd. by Mosel) |
| 110 | 3-74F283 (mfd. by Fairchild) |
| 111 | 3-74F283 (mfd. by Fairchild) |
| 120 | 1-93Z667 (mfd. by Fairchild) |
| 121 | 1-93Z667 (mfd. by Fairchild) |
| 122 | 1-93Z667 (mfd. by Fairchild) |
| 123 | 1-MB7111/2L (mfd. by Fujitsu) |
| 131 | 8-IDT 7165 (mfd. by Integrated Device Technology) |
| 132, 133, 134 | 1-AM29501 (mfd. by Integrated Device Technology) |
| 135: | |
| "max value" | 1-74F174 (mfd. by Fairchild) |
| "xmax" | 1-74F374 (mfd. by Fairchild) |
| "ymax" | 1-74F374 (mfd. by Fairchild) |
| "amax" | 1-74F374 (mfd. by Fairchild) |

All logic units described with reference to the drawings contain standard TTL or PAL Components.

Thus, in accordance with the present invention, novel methods for the automatic identification of fingerprints and novel apparatus for performing the functions required to identify fingerprints automatically have been described in detail above.

While specific embodiments of the invention have been disclosed, variations in procedural and structural detail within the scope of the appended claims, for example, the use of "negative" logic circuits instead of "positive" logic 1 circuits, are possible and are contemplated. There is, therefore, no intention of limitation to the abstract, or the exact disclosure herein presented.

What we claim is:

1. In a method for the automatic identification of fingerprints in which minutiae of a search print to be identified are matched with respect to their respective coordinates of location and angle against the coordinates of location and angle of minutiae of a plurality of file prints in a data base of fingerprints, in order to determine the existence or not of a match between said search print and one or more of said file prints, the improvement comprising the steps of (1) replicating at least one search print minutia by varying at least one of its coordinates of location and angle, thereby to obtain at least one additional minutia which is different from said search print minutia in at least one of said coordinates and (2) including said set of search print minutiae to be compared against the minutiae of said file prints.

2. The method of claim 1 in which the step of replicating said minutia is characterized by varying two coordinates of location.

3. The method of claim 1 in which the step of replicating said minutia is characterized by varying the coordinate of angle.

4. The method of claim 1 in which the step of replicating said minutia is characterized by varying each of its coordinates of location and angle.

5. The method of claims 1, 2, 3, or 4 in which the step of replicating is carried out a plurality of times with respect to at least one of the minutiae of said search print in order to generate a plurality of minutiae.

6. In a method for the automatic identification of fingerprints in which minutiae of a search print to be identified are matched with respect to their respective coordinates of location and angle against the coordinates of location and angle of minutiae of a plurality of file prints in a database of fingerprints, in order to obtain a matching score indicative of the degree of matching between said search print and one or more of said file prints, the improvement comprising the steps of (1) separately for a plurality of minutiae in said search print, computing the respective coordinates of location and angle throughout a range of pre-rotation angles, thereby to obtain a plurality of vector images of each of said search print minutiae, and (2) separately comparing a plurality of minutiae of a preselected number of file prints in said plurality of file prints, only against those ones of said plurality of vector images having an angle, after pre-rotation, which is equal t the angle of said file minutia being compared.

7. The method of claim 6 in which said range of pre-rotation angles is 360 degrees.

8. The method of claim 6 in which said range of pre-rotation angles is symmetrical with respect to the origin of the coordinate system of said search print and is twice as large as the assumed difference in orientation between the coordinate system of said search print and the coordinate system of sad file prints.

9. The method of claims 6, 7, or 8, in which said range is divided into equal increments.

10. In a method for the automatic identification of fingerprints in which minutiae of a search print to be identified are matched with respect to their respective coordinates of location and angle against the coordinates of location and angle of minutiae of each of a plurality of file prints in a database of fingerprints, in order to obtain a matching score indicative of the degree of matching between said search print and one or more of said file prints, the improvement comprising the steps of (1) separately for at least one minutia in said search print, identifying whether it is a ridge ending or a bifurcation;

(2) separately for at least one minutia in each of said file prints, identifying whether it is a ridge ending or a bifurcation; and (3) for each file print compared against said search print, incrementing said matching score thereby obtained by a predetermined amount related to whether respective pairs of file print and search print minutiae being compared are identified as both ridge endings or bifurcations.

11. In a method for the automatic identification of fingerprints in which minutiae of a search print to be identified are matched with respect to their respective coordinates of location and angle against the coordinates of location and angle of minutiae of a plurality of file prints in a database of fingerprints, in order to obtain a matching score indicative of the degree of matching between said search print and one or more of said file prints, the improvement comprising the steps of (1) separately for a plurality of minutiae in said search print, computing the respective coordinates of location and angle throughout a range of pre-rotation angles, thereby to obtain a plurality of vector images of each of said search print minutiae, (2) separately for at least one minutia in said search print, identifying whether it is a ridge ending or a bifurcation;

(3) separately for at least one minutia in each of said file prints, identifying whether it is a ridge ending or a bifurcation; and (4) separately comparing a plurality of minutiae of a preselected number of file prints in said plurality of file prints, only against those ones of said plurality of vector images having an angle, after pre-rotation, which is equal to the angle of said file minutia being compared;

(5) for each file print compared against said search print, incrementing said matching score thereby obtained by a predetermined amount related to whether respective pairs of file print and search print minutiae being compared are identified as both ridge endings or bifurcations.

12. In a method for the automatic identification of fingerprints in which minutiae of a search print to be identified are matched with respect to their respective coordinates of location and angle against the coordinates of location and angle of minutiae of a plurality of file prints in a database of fingerprints, in order to obtain a matching score indicative of the degree of matching between said search print and one or more of said file prints, the improvement comprising the steps of (1) separately for a plurality of minutiae in said search print, computing the respective coordinates of location and angle throughout a range of pre-rotation angles, thereby to obtain a plurality of vector images of each of said search print minutiae, (2) collecting all vector images for all search minutiae having the same angle after pre-rotation; and (3) separately comparing a plurality of minutiae of a preselected number of file prints in said plurality of file prints, only against those ones of said plurality of vector images having an angle, after pre-rotation, which is equal to the angle of said file minutia being compared.

13. The method of claim 12 in which said vector images of all of said search minutiae are arranged in a table in random access memory means, according to angle after pre-rotation.

14. In an apparatus for the automatic identification of fingerprints in which minutiae of a search print to be identified are matched with respect to their respective coordinates of location and angle against the coordinates of location and angle of minutiae of a plurality of file prints in a database of fingerprints, in order to obtain a matching score indicative of the degree of matching between said search print and one or more of said file prints, the improvement comprising the combination of
  (1) means for computing the respective coordinates of location and angle, throughout a range of prerotation angles, for a plurality of minutiae in said search print, thereby to obtain a plurality of vector images of each of said search print minutiae,
  (2) random access memory means for storing said plurality of vector images;
  (3) means for comparing a plurality of minutiae of a preselected number of file prints in said plurality of file prints, only against those ones of said plurality of vector images having an angle, after pre-rotation, which is equal to the angle of said file minutia being compared; and
  (4) means for deriving a matching score indicative of the degree of matching between said search print and one or more of said preselected file prints, based upon the comparisons performed by said comparing means.

15. In a method for the automatic identification of fingerprints in which minutiae of a search print to be identified are matched with respect to their respective coordinates of location and angle against the coordinates of the location and angle of minutiae of a plurality of file prints in a database of fingerprints, in order to obtain a matching score indicative of the degree of matching between said search print and one or more of said file prints, the improvement comprising the steps of
  (1) assigning to at least one of the minutiae of a file print or of the search print to which it is to be compared a value indicating the quality of that minutia and
  (2) for at least one comparison of a file print minutia against a search print minutia, incrementing said matching score thereby obtained by a predetermined amount when either minuitae has a quality factor of a preselected value.

16. In a method for the automatic identification of fingerprints in which minutiae of a search print to be identified are matched with respect to their respective coordinates of location and angle against the coordinates of location and angle of minutiae of a plurality of file prints in a database of fingerprints, in order to obtain a matching score indicative of the degree of matching between said search print and one or more of said file prints, the improvement comprising the steps of
  (1) separately for a plurality of minutiae in said search print, computing the respective coordinates of location and angle throughout a range of pre-rotation angles, thereby to obtain a plurality of vector images of each of said search print minutiae,
  (2) assigning to at least one of the minutiae of a file print or of the search print to which it is to be compared a value indicating the quality of that minutia;
  (3) separately comparing a plurality of minutiae of a preselected number of file prints in said plurality of file prints, only against those ones of said plurality of vector images having an angle, after pre-rotation, which is equal to the angle of said file minutia being compared;
  (4) for each file print compared against said search print, incrementing said matching score thereby obtained by a predetermined amount related to whether either of the file print or search print minutiae being compared has a quality factor of a preselected value.

17. The method of claims 10 or 11 further comprising the steps of
  (1) assigning to at least one of the minutiae of a file print or the search print to which it is to be compared a value indicating the quality of that minutia and
  (2) for at least one comparison of a file print minutia against a search print incrementing said matching score thereby obtained by a predetermined amount when either minuitae has a quality factor of a preselected value.

18. In a method for the automatic identification of fingerprints in which minutiae of a search print to be identified are matched with respect to their respective coordinates of location and angle against the coordinates of the location and angle of minutiae of a plurality of file prints in a database of fingerprints, in order to obtain a matching score indiciative of the degree of matching between said search print and one or more of said file prints, the improvement comprising the steps of
  (1) assigning to at least one of the minutiae of a file print or of the search print to which it is to be compared a value indicating the quality of that minutia and
  (2) for at least one comparison of a file print minutia against a search print minutia, incrementing said matching score thereby obtained by a predetermined amount, which depends on both the quality of the search minutia and the quality of the file minutia.

19. In a method for the automatic identification fingerprints in which minutiae of a search print to be identified are matched with respect to their respective coordinates of location and angle against the coordinates of location and angle of minutiae of a plurality of file prints in a database of fingerprints, in order to obtain a matching score indicative of the degree of matching between said search print and one or more of said file prints, the improvement comprising the steps of
  (1) separately for a plurality of minutiae in said search print, computing the respective coordinates of location and angle throughout a range of pre-rotation angles, thereby to obtain a plurality of vector images of each of said search print minutiae,
  (2) assigning to at least one of the minutiae of a file print or of the search print to which it is to be compared a value indicating the quality of that minutia;
  (3) separately comparing a plurality of minutiae of a preselected number of file prints in said plurality of file prints, only against those ones of said plurality of vector images having an angle, after pre-rotation, which is equal to the angle of said file minutia being compared;
  (4) for each file print compared against said search print, incrementing said matching score thereby obtained by a predetermined amount, which depends on both the quality of the search minutia and the quality of the file minutia.

20. The method of claims 10 or 11 further comprising the steps of (1) assigning to at least one of the minutiae of a file print or the search print to which it is to be compared a value indicating the quality of that minutia and (2) for at least one comparison of a file print thereby obtained by a predetermined amount, which depends on both the quality of the search minutia and the quality of the file minutia.

* * * * *

UNITED STATES PATENT AND TRADEMARK OFFICE
CERTIFICATE OF CORRECTION

PATENT NO. : 4,790,564

DATED : December 13, 1988

INVENTOR(S) : PHILIPPE LARCHER, et al

It is certified that error appears in the above-identified patent and that said Letters Patent is hereby corrected as shown below:

Column 4, line 44 change "the in which" to -in which the-
Column 7, line 56 change "minatia" to -minutia-
Column 8, line 18 change "Y"s" to -y"s-
Column 8, line 60 change "$s_i$" to -$s^i$-
Column 8, line 61 change "$s_i$" to -$s^i$-
Column 9, line 21 change "Ak" to -$A_k$-
Column 9, line 40 the "f" in the word "af" should be in italics
Column 9, line 51 change "$s^1$" to -$s^i$-, line 54, change "$s^i$" to -- $s^j$--
Column 9, line 53 the "i" in the word "si" should be in italics
Column 10, Table A (approximately lines 10-19) the columns should be aligned
Column 11, line 33 change "columntable" to -column-table-
Column 11, line 49 change "te" to -the-
Column 13, line 15 change "a" to -$a_f$
Column 14, line 29 "and" (both occurrences) should be in italics
Column 14, line 64 "and" should be in italics
Column 15, line 2 "and" should be in italics, second occurrence.
Column 16, line 40 change "$\leq$ -100" to -$\leq$ 100-
Column 16, line 47 change "-100, 100]" to - -100, +100].-
Column 16, line 63 change "suord" to -supra-
Column 17, line 36 "input 37" should be -input values. In the search data computation unit 41, lines 36 and 37-
Column 18, line 52 "or" (all occurrences) should be in italics

UNITED STATES PATENT AND TRADEMARK OFFICE
CERTIFICATE OF CORRECTION

PATENT NO. : 4,790,564

DATED : December 13, 1988

INVENTOR(S) : PHILIPPE LARCHER, et al

Page 2 of 2

It is certified that error appears in the above-identified patent and that said Letters Patent is hereby corrected as shown below:

Column 19, line 23 change "$q_s$", second occurrence, to -- $q_f$ --
Column 20, line 11 "and" (both occurrences) should be in italics
Column 20, line 36 "and" should be in italics
Column 21, line 37 change "counters tables" to -counter table-
Column 22, line 12 change "tables" to -table-
Column 22, line 30 change "lists of" to -lists-
Column 22, line 63 change "logic 1" to -logic-
Column 23, line 13 change "said set" to -said replicated minutiae in the said set-
Column 23, line 47 change "t" to -to-
Column 23, line 56 change "sad" to -said-
Column 26, line 40 change "identification fin-" to -identification of fin- -
Column 28, line 3 change "print thereby" to -print minutia against a search print incrementing said matching score thereby- Signed and Sealed this Seventh Day of November, 1989

*Attest:*

JEFFREY M. SAMUELS

*Attesting Officer*     *Acting Commissioner of Patents and Trademarks*